US012613386B2

(12) United States Patent
Kuo et al.

(10) Patent No.: US 12,613,386 B2
(45) Date of Patent: Apr. 28, 2026

(54) GEL DISPENSATION APPARATUS INCLUDING DUAL FLOW CONTROL CHANNELS AND METHOD OF OPERATING THE SAME

(71) Applicant: Taiwan Semiconductor Manufacturing Company Limited, Hsinchu (TW)

(72) Inventors: Hsuan-Ting Kuo, Taichung City (TW); Hsiu-Jen Lin, Zhubei City (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 127 days.

(21) Appl. No.: 18/608,979

(22) Filed: Mar. 19, 2024

(65) Prior Publication Data

US 2025/0298201 A1 Sep. 25, 2025

(51) Int. Cl.
G02B 6/42 (2006.01)

(52) U.S. Cl.
CPC ................................. G02B 6/4239 (2013.01)

(58) Field of Classification Search
CPC .. G02B 6/3883; G02B 6/3672; G02B 6/3696;

G02B 6/2835; G02B 6/2856; G02B 6/4245; G02B 6/29332; G02B 6/02395; G02B 6/02033; G02B 6/4239
See application file for complete search history.

(56) References Cited

U.S. PATENT DOCUMENTS

2024/0418944 A1* 12/2024 Wang ................... G02B 6/3672

FOREIGN PATENT DOCUMENTS

EP 3910390 A1 * 11/2021 ........... G02B 6/3616

* cited by examiner

*Primary Examiner* — Vishal I Patel
(74) *Attorney, Agent, or Firm* — The Marbury Law Group, PLLC

(57) ABSTRACT

A fiber array unit (FAU) may be attached to a photonic integrated circuit (PIC) die by: disposing an end surface of the FAU on a surface of the PIC die that contains, or is proximal to, end surfaces of waveguides with the PIC die; providing a gel dispensation apparatus including a first gel supply line, a vacuum line, and a second gel supply line configured to flow a fraction of the supply flow at a terminal output flow rate toward a dispensation tip; dispensing the gel around, and onto, a periphery of an interface between the end surface of FAU and the surface of the PIC die; and curing a dispensed portion of the gel around the periphery of the interface, whereby the FAU is attached to the PIC die.

15 Claims, 21 Drawing Sheets

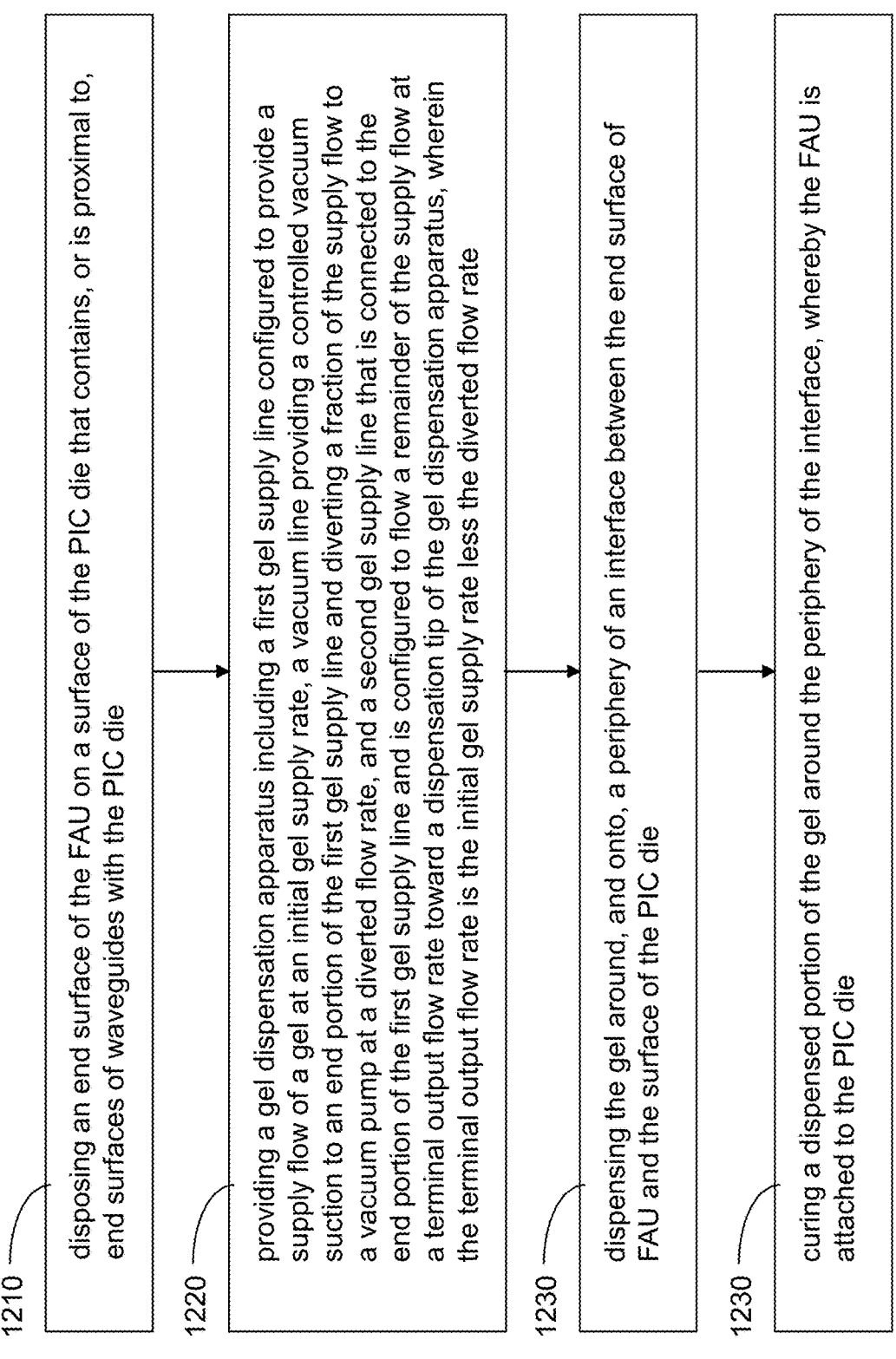

1210 — disposing an end surface of the FAU on a surface of the PIC die that contains, or is proximal to, end surfaces of waveguides with the PIC die 1220 — providing a gel dispensation apparatus including a first gel supply line configured to provide a supply flow of a gel at an initial gel supply rate, a vacuum line providing a controlled vacuum suction to an end portion of the first gel supply line and diverting a fraction of the supply flow to a vacuum pump at a diverted flow rate, and a second gel supply line that is connected to the end portion of the first gel supply line and is configured to flow a remainder of the supply flow at a terminal output flow rate toward a dispensation tip of the gel dispensation apparatus, wherein the terminal output flow rate is the initial gel supply rate less the diverted flow rate 1230 — dispensing the gel around, and onto, a periphery of an interface between the end surface of FAU and the surface of the PIC die 1230 — curing a dispensed portion of the gel around the periphery of the interface, whereby the FAU is attached to the PIC die

FIG. 12

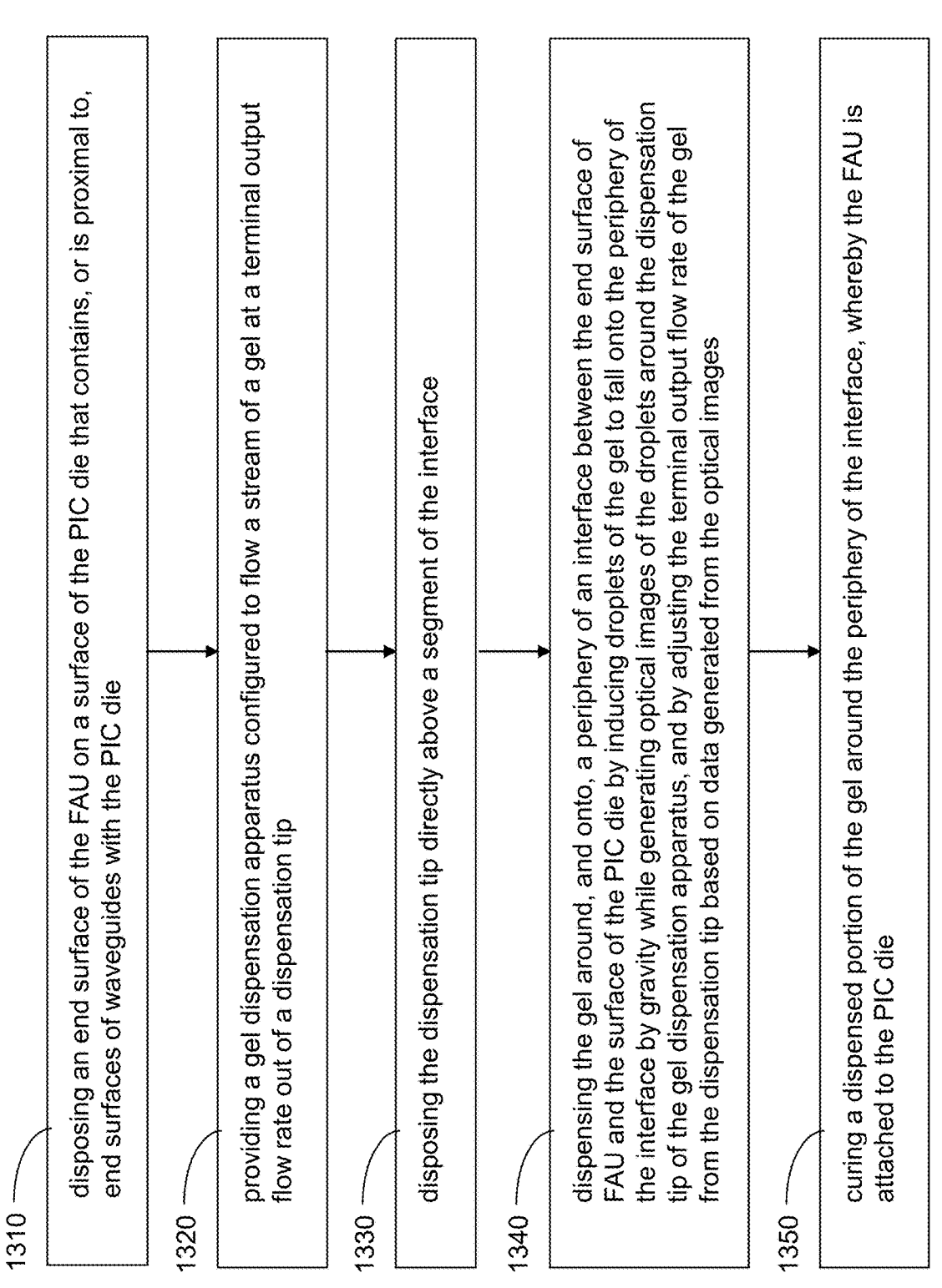

1310 — disposing an end surface of the FAU on a surface of the PIC die that contains, or is proximal to, end surfaces of waveguides with the PIC die 1320 — providing a gel dispensation apparatus configured to flow a stream of a gel at a terminal output flow rate out of a dispensation tip 1330 — disposing the dispensation tip directly above a segment of the interface 1340 — dispensing the gel around, and onto, a periphery of an interface between the end surface of FAU and the surface of the PIC die by inducing droplets of the gel to fall onto the periphery of the interface by gravity while generating optical images of the droplets around the dispensation tip of the gel dispensation apparatus, and by adjusting the terminal output flow rate of the gel from the dispensation tip based on data generated from the optical images 1350 — curing a dispensed portion of the gel around the periphery of the interface, whereby the FAU is attached to the PIC die

FIG. 13

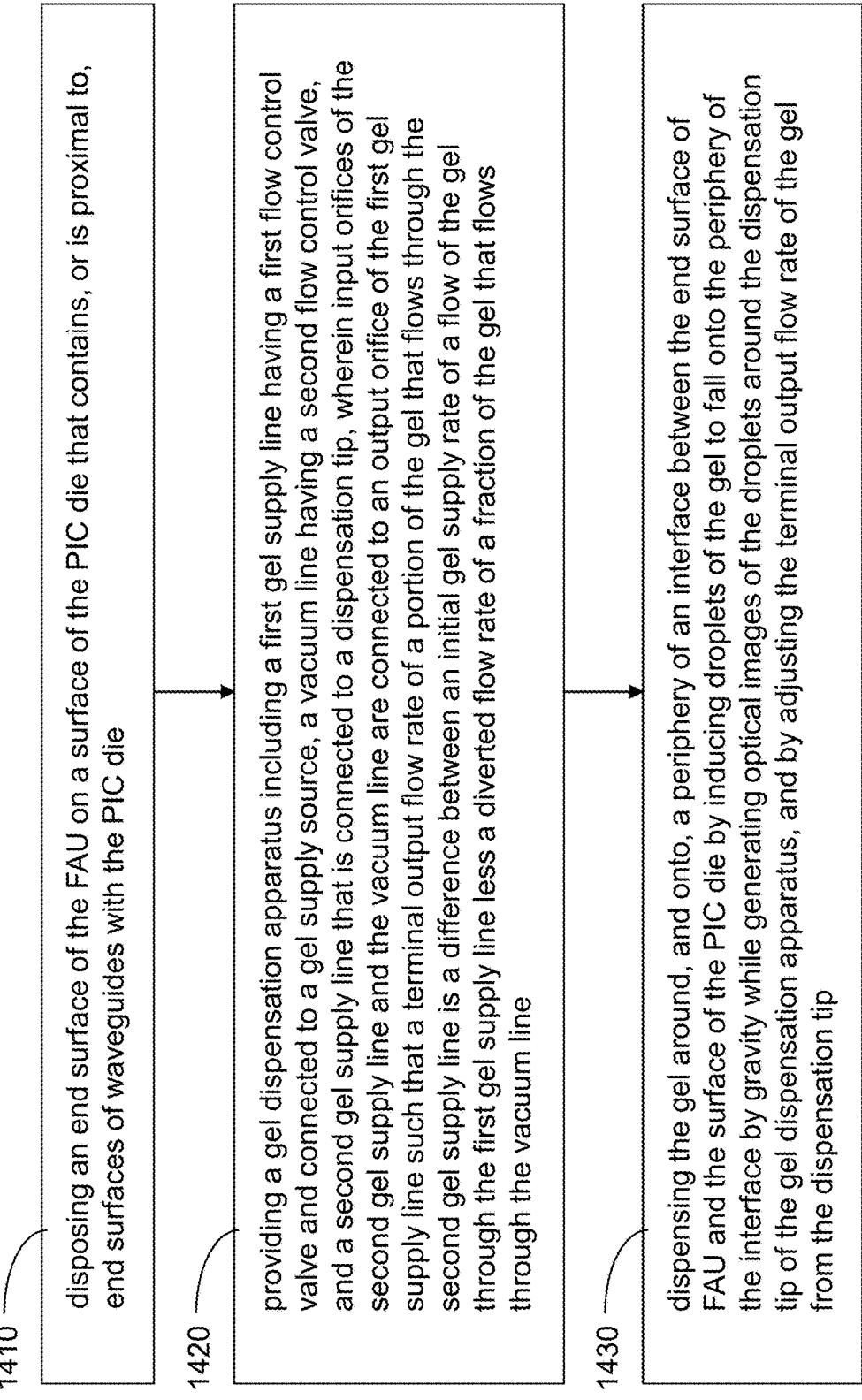

1410 — disposing an end surface of the FAU on a surface of the PIC die that contains, or is proximal to, end surfaces of waveguides with the PIC die 1420 — providing a gel dispensation apparatus including a first gel supply line having a first flow control valve and connected to a gel supply source, a vacuum line having a second flow control valve, and a second gel supply line that is connected to a dispensation tip, wherein input orifices of the second gel supply line and the vacuum line are connected to an output orifice of the first gel supply line such that a terminal output flow rate of a portion of the gel that flows through the second gel supply line is a difference between an initial gel supply rate of a flow of the gel through the first gel supply line less a diverted flow rate of a fraction of the gel that flows through the vacuum line 1430 — dispensing the gel around, and onto, a periphery of an interface between the end surface of FAU and the surface of the PIC die by inducing droplets of the gel to fall onto the periphery of the interface by gravity while generating optical images of the droplets around the dispensation tip of the gel dispensation apparatus, and by adjusting the terminal output flow rate of the gel from the dispensation tip

FIG. 14

GEL DISPENSATION APPARATUS INCLUDING DUAL FLOW CONTROL CHANNELS AND METHOD OF OPERATING THE SAME

BACKGROUND

A photonic integrated circuit (PIC) die includes waveguides for transmission of optical signals therein. A subset of the waveguides in the PIC die may be used as input/output waveguides that are configured to emit output optical signals or to receive input optical signals. Such input/output waveguides may be optically coupled to optical fibers that are external to the PIC die. In this case, the optical fibers may be provided in a fiber array unit (FAU) including an array of optical fibers and an optical gel that embeds, and provides structural support to, the array of optical fibers. It is desirable to securely affix the FAU to a sidewall of the PIC die including end portions of the input/output waveguides in order to optically couple the PIC die to the FAU. Failure to secure the FAU on the PIC die may result in degradation of optical signal transmission into, and out of, the PIC die, and/or may result in optical decoupling of the PIC die from an optical circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12 is a first flowchart illustrating general processing steps for forming a photonic assembly of the present disclosure.

FIG. 13 is a second flowchart illustrating general processing steps for forming a photonic assembly of the present disclosure.

FIG. 14 is a third flowchart illustrating general processing steps for forming a photonic assembly of the present disclosure.

DETAILED DESCRIPTION

Figure 1A:
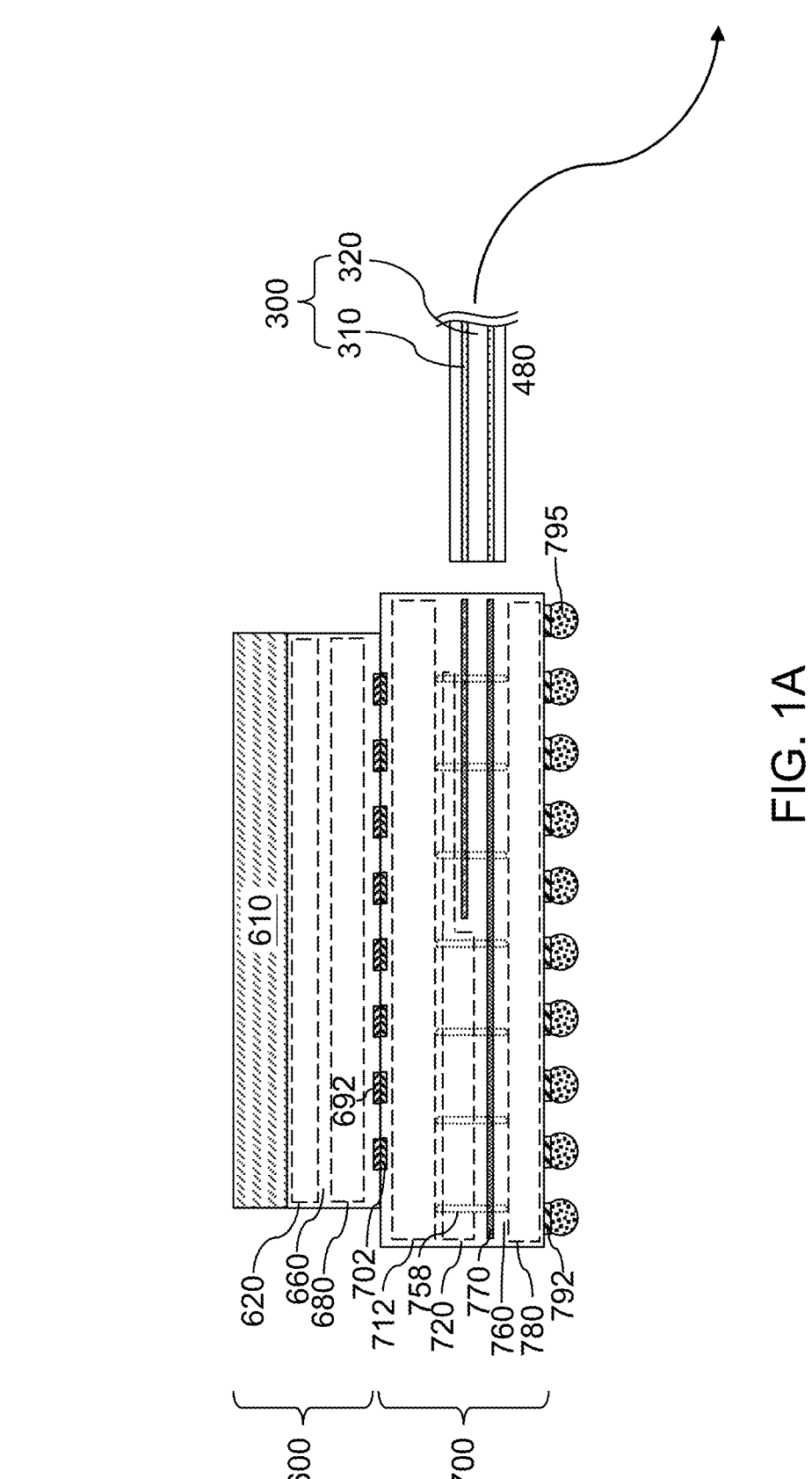
FIG. 1A is a vertical cross-sectional view of a composite die and a fiber array unit (FAU) prior to fastening.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Elements with the same reference numerals are presumed to be the same element or similar elements, and are presumed to have the same material composition and provide the same function, unless expressly described otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise. As used herein, an element or a system "configured for" a function or an operation or "configured to" provide or perform a function or an operation refers to an element or a system that is provided with hardware, and with software as applicable, to provide such a function or such an operation as described in the present disclosure, and as known in the art in the event any details of such hardware or such software are not expressly described herein.

A compact universal photonic engine (COUPE) includes a combination of PICs and EICs that provides optical-electrical transmission. A COUPE allows for the processing of optical signals using an electronic signal transmission system. A COUPE integrates various optical components, electro-optics transition devices, and optical fibers. In optical-electrical devices, laser light plays a pivotal role. Optical fibers may be used to feed laser light to a COUPE. The laser light may pass through a supporting silicon substrate. The laser light may be re-focused and re-concentrated through optical lenses to reduce spatial light divergence.

Embodiments of the present disclosure provide transmission of optical signal without the use of dies that are bonded using metal-to-metal bonding, which is also referred to as SoIC bonding. Metal-to-metal bonding is costly and benefits from precise alignment between components. In one embodiment, microbump bonding may be used to provide a photonic assembly including various types of dies attached to a common packaging substrate. Embodiments of the present disclosure provide optical connection between modules and external fibers without relying on the waveguides provided within an interposer. In one embodiment, a silicon interposer for connecting waveguides may be replaced with optical components that are interconnected to one another for direct optical signal transmission thereamongst. The various embodiment methods may increase flexibility for manufacture of advanced optical systems while reducing the total manufacturing cost. Various embodiment methods of the present disclosure may be applicable to photonic integrated circuits, silicon photonics, three-dimensional integrated circuits for photonic applications, and COUPE structures.

According to an aspect of the present disclosure, the COUPE may include optical elements for effectively channeling of the laser light (also referred simply as light) to optical devices in a die. Specifically, an optical deflector may be provided in a COUPE die to couple vertically-propagating laser light to horizontally-extending waveguides within the COUPE die. Specifically, the COUPE die of the various embodiments may include a COUPE-based optical-electrical transmission systems that includes an optical connector module that is attached to, or integrated into, a COUPE die, an optical deflector formed within the COUPE die, and a vertical light path between the optical connector module and the optical connector module.

The present disclosure related to a fiber-to-die attachment apparatus for attaching a fiber array unit (FAU) to a photonic integrated circuit (PIC) die and methods for operating the same. Gel dispensation apparatuses currently in use to attach an FAU to a PIC die encounter challenges in providing precise process control over droplet sizes. This may an issue for use in attachment of an FAU to a sidewall of a PIC die because variations in the droplet size and/or application rate of a gel may cause irregularities in a cured gel structure around an interface between the FAU and the PIC die, and reduce reliability of the optical coupling between the PIC and the FAU.

According to an aspect of the present disclosure, a fiber-to-die attachment apparatus may use a gel dispensation apparatus including a dual-channel dispensation unit. The gel dispensation apparatus of the various embodiments may be used in conjunction with a droplet size control mechanism including an optical camera configured to continuously generate optical images of a region around a dispensation tip of the gel dispensation apparatus. The gel may be applied at a uniform application rate to provide formation of an encasement gel structure having a uniform thickness around the interface between the PIC die and the FAU. The dual-channel dispensation unit enhances uniformity of gel droplets during application of the gel. Flow control rate valves may be used to control duration, frequency, and pressure of a droplet formation process at the dispensation tip. Further, the dual-channel dispensation unit may provide a higher throughput for formation of encasement gel structures.

According to an aspect of the present disclosure, the size of gel droplets may be regulated by utilizing an optical camera (such as a charge-coupled device (CCD) camera) to continuously measure the droplet size during dispensation of the gel. In embodiments in which the rate of increase in the volume of a droplet is below a target volume increment rate, a first control valve connected to the outlet of the gel supply source may increment the flow rate of the gel, and thus, increase the rate of volume increase in the volume of the droplet. Alternatively, a second control valve connected to a vacuum vent line in the path of the gel may be closed more to increase the rate of increase in the volume of the droplet. In embodiments in which the rate of increase in the volume of a droplet is above the target volume increment rate, the first control valve connected to the outlet of the gel supply source may be closed more to reduce the flow rate of the gel, and thus, to decrease the rate of volume increase of the droplet. Alternatively, the second control valve connected to the vacuum vent line in the path of the gel may be opened more to increase the rate of increase in the volume of the droplet. The size of the gel droplets may be generally regulated in alternative methods by analyzing the optical images that are generated by the optical camera to extract other parameters that are relevant to the terminal output flow rate of the gel out of the dispensation tip, and by altering the terminal output flow rate of the gel through the dispensation tip by controlling at least one of the control valves in the dual-channel dispensation unit. The methods of the present disclosure may enhance the dispensation capability for a gel for edge coupling applications by providing a robust and controlled method for managing the droplet size, for improving the precision of the gel application rate, and for enhancing the throughput of the gel dispensation process. The various embodiments of the present disclosure are now described with reference to accompanying drawings.

Figure 1C:
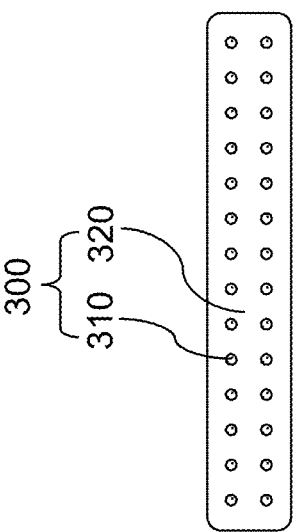
FIG. 1C is a side view of a mating end surface of the FAU.
Figure 1B:
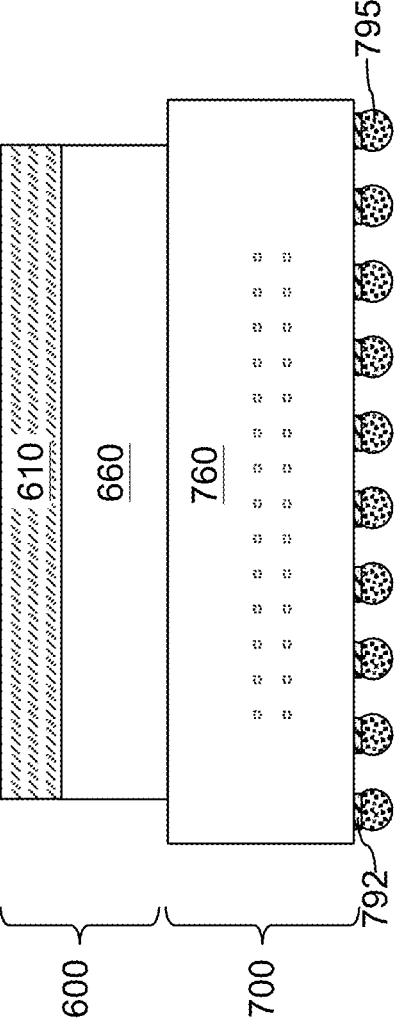
FIG. 1B is side view of the composite die along a first horizontal direction hd1 shown in FIG. 1A.

Referring collectively to FIGS. 1A-1C, a composite die (600, 700) and a fiber array unit (FAU) 300 are illustrated in various views before the FAU 300 is fastened to the composite die (600, 700). FIG. 1A is a vertical cross-sectional view of the composite die (600, 700) and the FAU 300 prior to fastening. FIG. 1B is side view of the composite die (600, 700) along a first horizontal direction hd1 shown in FIG. 1A. FIG. 1C is a side view of a mating end surface of the FAU 300.

In one embodiment, the composite die (600, 700) comprises a COUPE (600, 700), which includes a combination of photonic integrated circuits provided in a photonic integrated circuits (PIC) die 700 and electronic integrated circuits provided in an electronic integrated circuits (EIC) die 600. The composite die (600, 700) may be formed by providing a PIC die 700 and an EIC die 600. The PIC die 700 comprises various types of photonic devices 720 (which may be any type of photonic devices known in the art), waveguides 770 providing optical paths between optical nodes of the various photonic devices 720 extending to a sidewall of the PIC die 700 that faces the FAU 300, first metal interconnect structures 712 configured to provide electrical connections between the photonic devices 720 and the EIC die 600, second metal interconnect structures 780 configured to provide electrical connections to an interposer to be subsequently used, and vertical metal connection structures 758 vertically extending through levels of the photonic devices 720 and the waveguides 770 and providing electrical connections between the first metal interconnect structures 712 and the second metal interconnect structures 780.

In one embodiment, the photonic devices 720, the waveguides 770, the first metal interconnect structures 712, the second metal interconnect structures 780, and the vertical metal connection structures 758 may be embedded in dielectric material layers 760. In one embodiment, the dielectric material layers 760 may comprise, and/or may consist essentially of, inorganic dielectric materials such as silicon oxide, silicon nitride, silicon carbide nitride, and/or dielectric metal oxides. At least a subset of the waveguides 770 that are proximal to the sidewall of the PIC die 700 that faces the FAU 300 may laterally extend along the first horizontal direction hd1, which is perpendicular to the sidewall of the PIC die 700.

The widths and heights of the waveguides 770 may be selected based on the wavelength of the optical signals to be used in the PIC die 700 and based on the material composition of the waveguides 770. In embodiments in which silicon nitride is used as the material of the waveguides 770 and in embodiments in which wavelengths (as measured in vacuum) within a range from 0.5 micron to 1.6 micron is used for the optical signals within the PIC die, the width of the waveguides 770 may be in a range from 300 nm to 1,000 nm, and the height of the waveguides may be in a range from 150 nm to 500 nm, although lesser and greater dimensions may also be used. In embodiments in which silicon is used as the material of the waveguides 770 and in embodiments in which wavelengths (as measured in vacuum) within a range from 0.5 micron to 1.6 micron is used for the optical signals within the PIC die, the width of the waveguides 770 may be in a range from 150 nm to 600 nm, and the height of the waveguides may be in a range from 100 nm to 400 nm, although lesser and greater dimensions may also be used.

Generally, end surfaces of an array of waveguides 770 may be formed at, or in proximity to, the sidewall of the PIC die 700 that faces the FAU 300. In some embodiments, the end surfaces of the array of waveguides 770 may be formed at the sidewall of the PIC die 700 that faces the FAU 300. Alternatively, the end surfaces of the array of waveguides 770 may be laterally offset from the sidewall of the PIC die 700 that faces the FAU 300 by surface portions of the dielectric material layers 760 having a lateral dimension not greater than 200 nm. In this embodiment, evanescent coupling may be used between the waveguides 770 and the FAU 300 upon attaching the FAU 300 to the PIC die 700.

A subset of the waveguides 770 having end surfaces at, or in proximity to, the sidewall of the PIC die 700 that faces the FAU 300 may be arranged as a periodic array. The periodic array may comprise a one-dimensional array of N waveguides 770, in which N is an integer in a range from 2 to 1,024, such as from 4 to 256. Alternatively, the periodic array may comprise a one-dimensional or two-dimensional array of M×N waveguides 770, in which M is an integer in a range from 1 to 8, and N is an integer in a range from 2 to 128, such as from 4 to 32. Generally, pitch of the periodic array along a second horizontal direction that is perpendicular to the first horizontal direction hd1 may be selected match the pitch of the FAU 300 along the second horizontal direction. In embodiments in which a two-dimensional array of waveguides 770 is provided at, or in proximity to, the sidewall of the PIC die 700 for optical coupling, the pitch of the periodic array along the vertical direction may be at least twice the height of each waveguide 770, and preferably, may be in a range from 4 times the height of each waveguide 770 to 32 times the height of each waveguide 770.

A top side of the PIC die 700 may comprise metallic bonding pads configured for metal-to-metal bonding (such as copper-to-copper bonding), which are herein referred to as PIC metallic bonding pads 702. A bottom side of the PIC die 700 may comprise on-die bump structures 792, i.e., bump structures that are formed on a die. The on-die bump structures 792 may comprise microbump structures (i.e. C2 bump structures) or C4 bump structures. An array of first solder material portions 795 may be attached to the on-die bump structures 792.

The combination of the first metal interconnect structures 712, the second metal interconnect structures 780, and the vertical metal connection structures 758 within the PIC die 700 provides electrical connection between the PIC metallic bonding pads 702 and the on-die bump structures 792. In some embodiments, the PIC die 700 may be made from a semiconductor-on-insulator (SOI) wafer. In this embodiment, a thin semiconductor material layer (not expressly shown) may be present in proximity, or on, the photonic devices 720. Generally, an array of PIC dies 700 may be provided as a two-dimensional periodic array of PIC dies 700 within a wafer, and may be subsequently diced to provide a plurality of PIC dies 700.

The EIC die 600 comprises semiconductor devices 620 that are formed on a semiconductor substrate 610, which may comprise a silicon substrate. The semiconductor devices 620 may form electronic integrated circuits that are needed to control operation of the photonic devices 720 in the PIC die 700. The semiconductor devices 620 may comprise field effect transistors, diodes, resistors, capacitors, inductors, or various other types of semiconductor devices that may be manufactured on a semiconductor substrate. Further, metal interconnect structures 680 embedded within dielectric material layers 660 (which include inorganic interlayer dielectric (ILD) materials) may be provided in the EIC die 600. In addition, the EIC die 600 may comprise metallic bonding pads configured for metal-to-metal bonding, which are herein referred to as EIC metallic bonding pads 692. The EIC metallic bonding pads 692 may be arranged in a mirror image pattern of the pattern of the PIC metallic bonding pads 702. In some embodiments, the EIC die 600 may have a smaller lateral extent than the PIC die 700. Thus, the EIC die 600 may fit within the area of the PIC die 700 in a plan view upon aligning the EIC die 600 with the PIC die 700 for metal-to-metal bonding between the PIC metallic bonding pads 702 and the EIC metallic bonding pads 692.

The EIC die 600 may be attached to the PIC die 700, for example, by bonding the EIC metallic bonding pads 692 to the PIC metallic bonding pads 702 through metal-to-metal bonding, such as copper-to-copper bonding. In embodiments in which a wafer including a two-dimensional array of PIC dies 700 is provided, a plurality of EIC dies 600 may be bonded to a respective PIC die 700 within the two-dimensional array of PIC dies 700. Subsequently, the bonded assembly of the wafer including the two-dimensional array of PIC dies 700 and the plurality of EIC dies 600 (each of which is bonded to a respective PIC die 700 through metal-to-metal bonding) may be diced to provide composite dies (600, 700). One of such composite dies (600, 700) which is selected for attachment of an FAU 300 is illustrated in FIGS. 1A and 1B. Alternatively, a composite die (600, 700) may be provided by performing a die-to-die bonding between a PIC die 700 and an EIC die 600 using metal-to-metal bonding.

In other alternative embodiments, an array of solder balls (not illustrated) may be used to bond a PIC die 700 and an EIC die 600. In this embodiment, a pair of arrays of solder bonding pads may be formed on the PIC die 700 and the EIC die 600, and the array of solder balls may be reflowed and bonded to a respective pair of solder bonding pads in the PIC die 700 and in the EIC die 600. Yet alternatively, a PIC die 700 may be used for attachment of an FAU 300. In this embodiment, an EIC die 600 may be attached to the PIC die 700 after the FAU 300 is attached to the PIC die. While the present disclosure is described using an embodiment in which the FAU 300 is attached to a PIC die 700 within a composite die (600, 700) within which the PIC die 700 and an EIC die 600 are bonded to each other through metal-to-metal bonding, the methods of the present disclosure may be used for any combination of a PIC die 700 and an FAU 300 irrespective of the bonding status or the bonding method of the PIC die 700 as far as bonding with an EIC die 600 is concerned.

The FAU 300 comprises an array of optical fibers 310 and a fiber sleeve 320 (which is also referred to as a fiber housing). Each of the optical fibers 310 may comprise any material and/or may have any configuration known in the art for effectively confining optical signals therein. The diameter of each optical fiber 310 may be in a range from 60 microns to 200 microns, although lesser and greater diameters may also be employed. The pitch of the optical fibers along the second horizontal direction that is perpendicular to the first horizontal direction hd1 may be in a range from 70 microns to 250 microns, although lesser and greater pitches may also be employed. Further, the optical fibers 310 within the array of optical fibers 310 may be arranged with a pattern which is a mirror image pattern of the array of waveguides 770 having end surface at, or in proximity to, the sidewall of the PIC die 700 that faces the FAU 300. If the array of waveguides 770 in the PIC die 700 is arranged as a periodic array, the optical fibers within the FAU 300 may be arranged with the same periodicity and with the same array size.

The fiber sleeve 320 comprise a polymer material with ultraviolet initiator for initiating curing under exposure to ultraviolet radiation. Upon curing, the first sleeve 320 becomes rigid enough to provide structural support to the optical fibers 310, while being flexible enough to allow bending of the FAU on a macroscopic scale, e.g., with a radius of curvature greater than 1 mm, and preferably greater than 5 mm. The lateral thickness of the optical gel at the periphery of the array of optical fibers 310 may be in a range from 100 microns to 300 microns, such as from 150 microns to 200 microns, although lesser and greater thicknesses may also be used. Generally, the FAU 300 has a shape of a long cable. It is noted that only an end portion of the FAU 300 is illustrated in many of the drawings of the present disclosure (such as FIG. 1), and portions of the FAU 300 that are not illustrated are schematically represented by a curved arrow, which connotes flexibility of the FAU 300 as a flexible cable. Generally, the portions of the FAU 300 that are not illustrated may be positioned in a manner that minimizes interference with components of a gel dispensation apparatus, a fastening mechanism, and a positioning mechanism to be subsequently used.

Figure 2A:
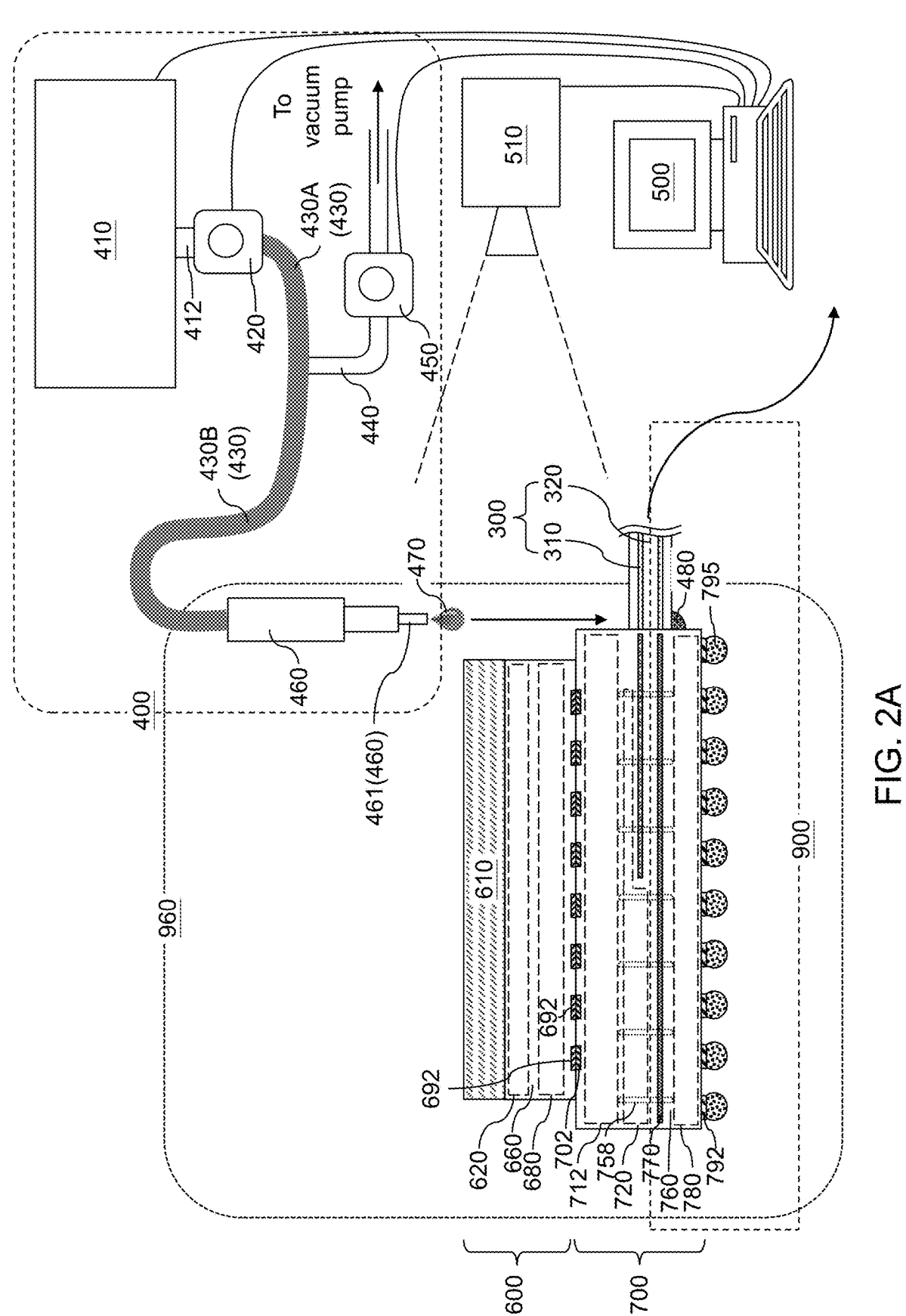
FIG. 2A illustrates a first configuration for operating a fiber-to-die attachment apparatus of the present disclosure.
Figure 2B:
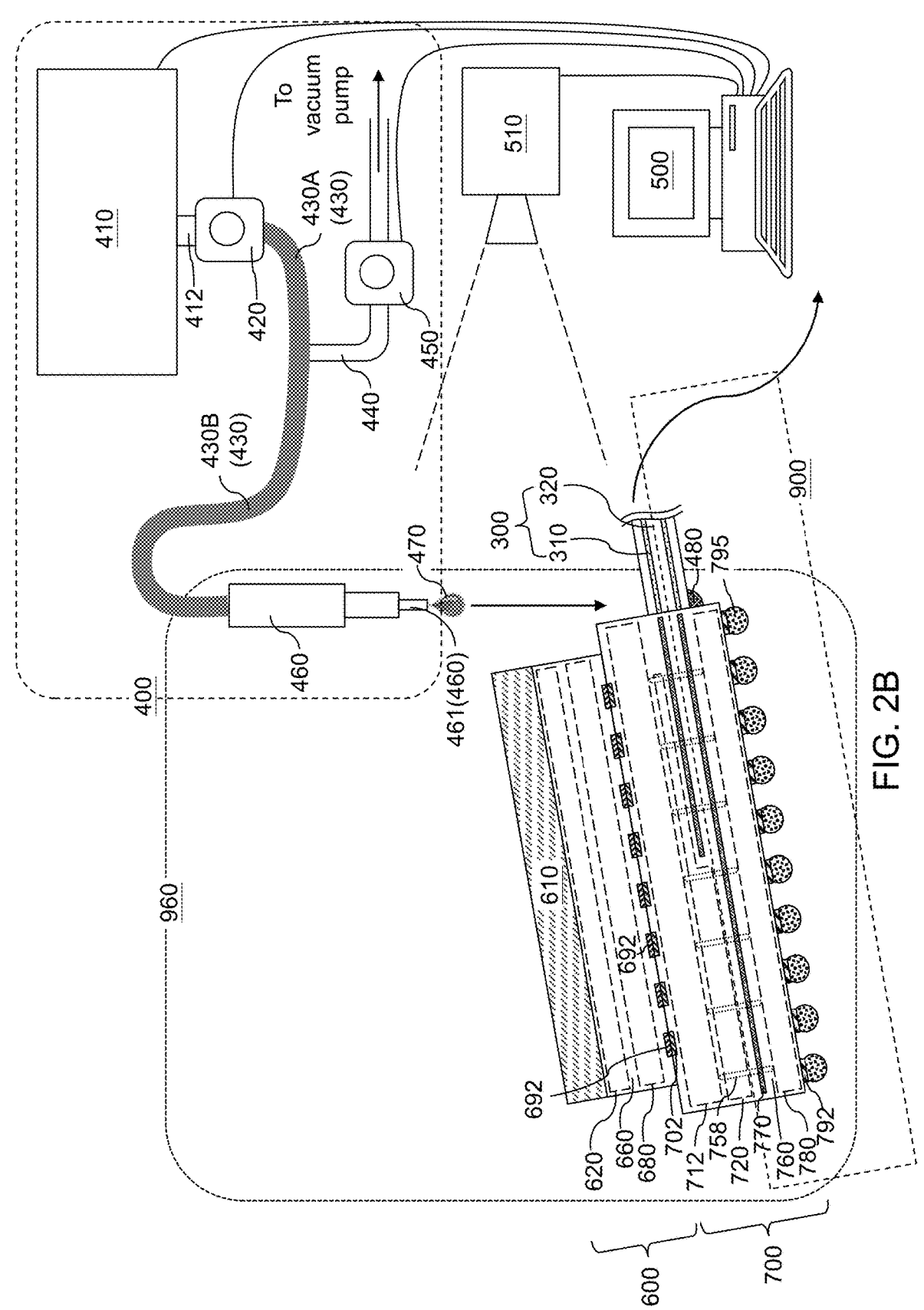
FIG. 2B illustrates a second configuration for operating the fiber-to-die attachment apparatus of the present disclosure.

Referring to FIGS. 2A and 2B, a first configuration and a second configuration for operating a fiber-to-die attachment apparatus of the present disclosure are illustrated, respectfully. The fiber-to-die attachment apparatus of the present disclosure may comprise a gel dispensation apparatus 400 that is configured to dispense droplets 470 of a gel, a fastening mechanism 900 for fastening the FAU 300 to the PIC die 700 (which may, or may not, be bonded to the EIC die 600 at this processing step), a positioning mechanism 960 that may provide relative lateral movement between a dispensation tip 461 of the gel dispensation apparatus 400 and the PIC die 700 by providing a lateral movement of at least one of the dispensation tip 461 and the PIC die 700, an optical image generation system 510 configured to generate optical images of droplets 470 of the gel around the dispensation tip 461 during dispensation of the gel, and a process controller 500 including a processor and an image analysis program that analyzes the optical images, and is configured to control components of the gel dispensation apparatus 400, the fastening mechanism 900, and the positioning mechanism 960.

The fastening mechanism 900 may be configured to dispose an end surface of a fiber array unit (FAU) 300 on the surface of a photonic integrated circuit (PIC) die 700 at, or around, which end surfaces of the array of waveguides 770 are provided. In one embodiment, such a surface of the PIC die 700 may be a sidewall of the PIC die 700, which is herein referred to as an optical interface sidewall of the PIC die 700. The fastening mechanism 900 may comprise any set of at least one mechanical component that is configured to push the FAU 300 against the optical interface sidewall of the PIC die 700. For example, the fastening mechanism 900 may comprise, but is not limited to, clamps, clips, pins, and snap-fit mechanisms. The fastening mechanism 900 may be spring-loaded, or may be controlled by an actuator that may control and/or measure the force that is applied to the assembly including the PIC die 700 and the FAU 300 so that the assembly is held together. Generally, any fastening mechanism 900 that may hold the assembly of the PIC die 700 and the FAU 300 steadily may be used, and as such, the present disclosure is not limited by the type of the fastening mechanism 900.

Generally, the fastening mechanism 900 is configured to hold an assembly of the FAU 300 and the PIC die 700 such that a Euclidean plane including an interface between the FAU 300 and the PIC die 700 may be vertical, or may be tilted relative to a direction of a local effective gravitational field during application of droplets 470 of the gel from the dispensation tip 461 to a segment of a periphery of the interface. As used herein, the local effective gravitational field refers to the force field formed by the combination of a gravitational force field and any force field that is apparently present due to inertial movement of the fiber-to-die attachment apparatus of the present disclosure. For example, in instances in which the fiber-to-die attachment apparatus of an embodiment is positioned on the surface of the earth, an apparent force field of a centrifugal force is present within the frame at which the fiber-to-die attachment apparatus rotates around the rotation axis of the earth. Thus, the local effective gravitational field defines the direction along which a free body with an initial velocity of zero will move within the frame along which the fiber-to-die attachment apparatus of the present disclosure is present.

In the first configuration illustrated in FIG. 2A, the Euclidean plane is vertical. In the second configuration illustrated in FIG. 2B, the Euclidean plane is tilted relative to the direction of the local effective gravitational field, which is hereafter referred to as a vertical direction. The tilt angle of the Euclidean plane relative to the vertical direction may be in a range from 0.01 degree to 60 degrees, such as from 3 degrees to 30 degrees, although lesser and greater tilt angles may also be used.

The gel dispensation apparatus 400 is configured to induce droplets 470 of a gel to fall on an upper segment of the periphery of the interface between the PIC die 700 and the FAU 300. The gel that is dispensed by the gel dispensation apparatus 400 may comprise an adhesive gel or an optical epoxy. The gel may have a material composition providing a refractive index that matches, or substantially matches, the refractive index of the fiber sleeve 320 so that reflection or refraction at the interface with the fiber sleeve 320 is eliminated or minimized. Further, the gel may have adhesive properties to provide secure attachment of the FAU 300 to the PIC die 700 upon curing. In addition, the material composition of the gel may be selected to provide protection from the environment and not to interfere with the functionality of the FAU 300 over time. In addition, the gel may have high thermal conductivity to assist in dissipation of heat from the PIC die 700. Optionally, the gel may be optically transparent. The gel may, or may not, include various additives such as polymer materials, resins, fillers, etc.

The gel dispensation apparatus 400 may comprise a gel supply source 410 having an outlet port 412. The gel supply source 410 may comprise any mechanical component that is configured to supply the gel. The gel passes through the outlet port 412, and is supplied to a flow-controlled gel distribution manifold. The flow-controlled gel distribution manifold comprises a first gel supply line 430A having a first flow control valve 420 and connected to a gel supply source 410 through the outlet port 412, a vacuum line 440 having a second flow control valve 450 and is connected to a vacuum pump (which may be any vacuum pump known in the art), and a second gel supply line 430B that is connected to a syringe dispenser 460 that includes a dispensation tip 461. Input orifices of the second gel supply line 430B and the vacuum line 440 are connected to an output orifice of the first gel supply line 430A.

The first flow control valve 420 may control the flow rate of the gel therethrough, which is herein referred to as an initial gel supply rate, i.e., the flow rate of the gel that passes through the first gel supply line 430A and arrives at the output orifice of the first gel supply line 430A. The second flow control valve 450 may control the flow of the gel therethrough, which is herein referred to as a diverted flow rate, i.e., the flow rate of the fraction of the gel that is diverted to the vacuum pump. The flow rate of the portion of the gel that passes through the second gel supply line 430B is the same as the influx rate of the gel into the syringe dispenser 460, and is herein referred to as a terminal output flow rate. The terminal output flow rate of the portion of the gel that flows through the second gel supply line 430B is the difference between the initial gel supply rate of a flow of the gel through the first gel supply line 430A less the diverted flow rate of the fraction of the gel that flows through the vacuum line 440.

The flow-controlled gel distribution manifold including the first gel supply line 430A, the first flow control valve 420, the vacuum line 440, the second flow control valve 450, and the second gel supply line 430B constitutes a dual-channel dispensation unit. The first channel comprises the combination of the first gel supply line 430A and the first flow control valve 420, and contributes positively to the terminal output flow rate of the gel. The second channel comprises the combination of the vacuum line 440 and the second flow control valve 450, and contributes negatively to the terminal output flow rate of the gel.

Generally, the gel dispensation apparatus 400 configured to flow a stream of a gel at the terminal output flow rate out of the dispensation tip 461. A typical terminal output flow rate of the gel may be in a range from 0.1 microliter per minute to 10 microliters per minute. A typical initial gel supply rate may be in a range from 1.05 times the terminal output flow rate to 2.0 times the terminal output flow rate. A typical diverted flow rate may be in a range from 0.05 times the terminal output flow rate to 1.0 times the terminal output flow rate.

The positioning mechanism 960 is configured to position the dispensation tip 461 directly above a segment of a periphery of an interface between the FAU 300 and the PIC die 700. The positioning mechanism 960 may comprise at least one stepper motor and at least one linear actuator configured to move the syringe dispenser 460 and/or the assembly of the PIC die 700, the FAU 300, and the fastening mechanism 900. The rate of relative movement for the syringe dispenser 460 and the assembly of the PIC die 700, the FAU 300, and the fastening mechanism 900 may be selected to provide formation of the encasement gel structure 480 as a continuous structure. In an illustrative example, the rate of relative movement for the syringe dispenser 460 and the assembly of the PIC die 700, the FAU 300, and the fastening mechanism 900 may be in a range from 5 mm/sec to 50 mm/sec although lesser and greater rate of relative movement may also be used. The positioning and relative movement between the syringe dispenser 460 and/or the assembly of the PIC die 700, the FAU 300, and the fastening mechanism 900 may be controlled by the process controller 500 and a linear motion control software that runs in the process controller 500.

In addition, the positioning mechanism 960 is configured to hold the dispensation tip 461 with a vertical spacing between the dispensation tip 461 and the segment of the periphery of the interface between the FAU 300 and the PIC die 700. The vertical spacing may be greater than the maximum vertical dimension of a droplet 470 of the gel that may be formed at the dispensation tip 461 before falling off. For example, the vertical spacing may be in a range from 3 mm to 30 mm, although lesser and greater vertical spacings may also be used.

Further, the positioning mechanism 960 is configured to provide a relative lateral movement between the dispensation tip 461 and an assembly of the PIC die 700 and the FAU 300 and the fastening mechanism 900 along a horizontal extension direction of the segment of the periphery of the interface. Thus, the droplets 470 may continue to fall along the segment of the periphery of the interface between the FAU 300 and the PIC die 700.

In addition, the positioning mechanism 960 may be configured to rotate the combination of the FAU 300, the PIC die 700 (and the EIC die 600 in case the EIC die 600 is attached to the PIC die 700), and the fastening mechanism 900 when the dispensation tip 461 is positioned directly above the end point of the segment of the periphery of the interface between the FAU 300 and the PIC die 700. In this embodiment, the positioning mechanism 960 may comprise a rotatory actuator that is configured to rotate the combination of the FAU 300, the PIC die 700, and the fastening mechanism 900, and may further comprise bearings, support structures, movement sensors and feedback mechanisms. The rotation of the combination of the FAU 300, the PIC die 700, and the fastening mechanism 900 may be controlled by the process controller 500 and a rotary motion control software that runs in the process controller 500.

The rotation may be performed such that the beginning point of the next segment of the periphery of the interface between the FAU 300 and the PIC die 700 is positioned underneath the dispensation tip 461 upon rotation. Subsequently, the positioning mechanism 960 may provide a relative lateral movement between the dispensation tip 461 and the assembly of the PIC die 700 and the FAU 300 and the fastening mechanism 900 along a horizontal extension direction of the next segment of the periphery of the interface until the end point of the next segment of the periphery of the interface between the FAU 300 and the PIC die 700 is located directly underneath the dispensation tip 461.

Rotation of the combination of the FAU 300, the PIC die 700, and the fastening mechanism 900 and relative lateral movement between the dispensation tip 461 and the assembly of the FAU 300, the PIC die 700, and the fastening mechanism 900 may be repeated until all segments of the periphery of the interface between the PIC die 700 and the FAU 300 is coated with applied droplets 470 of the gel, and an encasement gel structure 480 is formed around the entire periphery of the interface between the PIC die 700 and the FAU 300.

In an alternative embodiment, the positioning mechanism 960 may be configured to provide only the relative lateral movement between the dispensation tip 461 and the assembly of the FAU 300, the PIC die 700, and the fastening mechanism 900 without providing a rotary movement of the FAU 300, the PIC die 700, and the fastening mechanism 900. In this embodiment, the droplets 470 of the gel may be applied only to the horizontally-extending top segment of the interface between the PIC die 700 and the FAU 300, and the applied portion of the gel may flow along the vertically-extending segments of the interface between the PIC die 700 and the FAU 300 due to surface tension and gravity, and may, or may not, flow along the horizontally-extending bottom segment of the interface between the PIC die 700 and the FAU 300 due to surface tension of the gel. In this embodiment, the encasement gel structure 480 may become ring-shaped, or may not become ring-shaped. In some embodiments, an air gap (not expressly shown) may be formed between the encasement gel structure 480 and the interface between the PIC die 700 and the FAU 300. In instances in which the air gap is present, the air gap may be a width on the order of about 100 microns. Alternatively, the droplets 470 of the gel may be applied to the horizontally-extending top segment of the interface between the PIC die 700 and the FAU 300 and to two vertically-extending segments of the interface between the PIC die 700 and the FAU 300. In this embodiment, the applied portion of the gel may flow at least partly along the horizontally-extending bottom segment of the interface between the PIC die 700 and the FAU 300 due to surface tension of the gel. Depending on the lateral extent of the flow of the gel along the horizontally-extending bottom segment of the interface between the PIC die 700 and the FAU 300, the encasement gel structure 480 may, or may not, become ring-shaped, i.e., may, or may not, enclose the entire periphery of the interface between the PIC die 700 and the FAU 300.

The optical image generation system 510 is configured to generate optical images of droplets 470 of the gel around the dispensation tip 461 during dispensation of the gel. The optical image generation system 510 may comprise any video camera that may provide the optical images of the droplets 470 at a sufficient image resolution (i.e., with a sufficient number of pixels) at a sufficiently high frame rate so that the change of dimensional parameters of the droplets 470 may be measured with accuracy. In one embodiment, the frame rate of the optical image generation system 510 may be in a range from 30 frames per second to 1,200 frames per second. The magnification of the optical image generation system 510 may be selected for effective measurement of the size of the droplets 470. For example, a telephoto lens may be provided within the optical image generation system

510 to provide measurement of the size of the droplets 470 at the length scale of microns and millimeters.

The process controller 500 is configured estimate a process parameter based on analysis of the optical images of the droplets 470, and is configured to increase or decrease the terminal output flow rate based on estimated values of the process parameter. The estimated process parameter is a process parameter that is related to the actual value of the terminal output flow rate of the gel, and/or is related to the material property of the gel (such as the viscosity of the gel).

In one embodiment, the process controller 500 may include a processor and an image analysis program that analyzes the optical images generated from the optical image generation system 510, and may be configured to control at least one of the first flow control valve 420 and the second flow control valve 450 based on data extracted from analysis of the optical images. In one embodiment, the process controller 500 may be configured to determine whether at least one measurement parameter is within a respective specification range. The at least one measurement parameter may be selected from an estimated data value for the terminal output flow rate, a maximum vertical dimension for the droplets 470, a maximum lateral dimension for the droplets 470, and a time period between success fall-offs of the droplets 470.

In one embodiment, the process controller 500 may be configured to determine a maximum vertical dimension of the droplets 470 before fall-off by analyzing the optical images using a computer and an image analysis program, and the process controller 500 may be configured to increase or decrease the terminal output flow rate based on measured values of the maximum vertical dimension. The target value for the maximum vertical dimension of the droplets 470 may be in a range from 30 microns to 1.5 mm, although lesser and greater target values may also be used.

In one embodiment, the process controller 500 may be configured to determine a maximum lateral dimension of the droplets 470 before the fall-off by analyzing the optical images using the computer and the image analysis program, and the process controller 500 may be configured to increase or decrease the terminal output flow rate based on measured values of the maximum lateral dimension. The target value for the maximum lateral dimension of the droplets 470 may be in a range from 20 microns to 1 mm, although lesser and greater target values may also be used.

In one embodiment, the process controller 500 may be configured to measure a periodicity of fall-off times of the droplets 470 by analyzing the optical images using a computer and an image analysis program. In other words, the droplets 470 may fall with a uniform frequency or with a substantially uniform frequency, and the period between successive drop-offs may be measured, which is the inverse of the frequency. In this embodiment, the process controller 500 may be configured to increase or decrease the terminal output flow rate based on measured values of the periodicity of the fall-off times. The target periodicity (i.e., the inverse of the frequency) of fall-off times of the droplets 470 may be in a range from 5 milliseconds to 200 milliseconds, such as from 10 milliseconds to 100 milliseconds, although lesser and greater values may also be used for the target periodicity.

In one embodiment, the process controller 500 may be configured to calculate an estimated data value for the terminal output flow rate by analyzing the optical images of the droplets 470. In this embodiment, the volume of a droplet 470 may be continuously calculated using a formula for estimating the volume. Generally, the volume of a droplet 470 is proportional to the vertical dimension of the droplet 470 and is proportional to the square of the lateral dimension of the droplet 470. For example, a formula such as p/6×V×L×L may be used to estimate the volume of each droplet 470, in which V is the measured vertical dimension of the droplet 470 and L is the measured lateral dimension of the droplet 470. The rate of change of the estimated volume of a droplet 470 as a function of time equals the measured terminal output flow rate. In this embodiment, the process controller 500 may be configured to increase or decrease the terminal output flow rate through the dispensation tip 461 based on the estimated data value for the terminal output flow rate.

In one embodiment, the process controller 500 may be configured to calculate the estimated data value for the terminal output flow rate by: (1) calculating maximum volumes for the droplets 470 before fall-off by analyzing the optical images using a computer and an image analysis program; (2) calculating time periods between success events of the fall-off of the droplets 470; and (3) dividing the sum of the maximum volumes by the sum of the time periods.

In one embodiment, increasing the terminal output flow rate may be effected by increasing the initial gel supply rate of the gel, and decreasing the terminal output flow rate may be effected by decreasing the initial gel supply rate of the gel. Alternatively or additionally, increasing the terminal output flow rate may be effected by decreasing the diverted flow rate of the gel, and decreasing the terminal output flow rate may be effected by increasing the diverted flow rate of the gel.

Figures 3A, 3B, 3C, 3D, 3E:
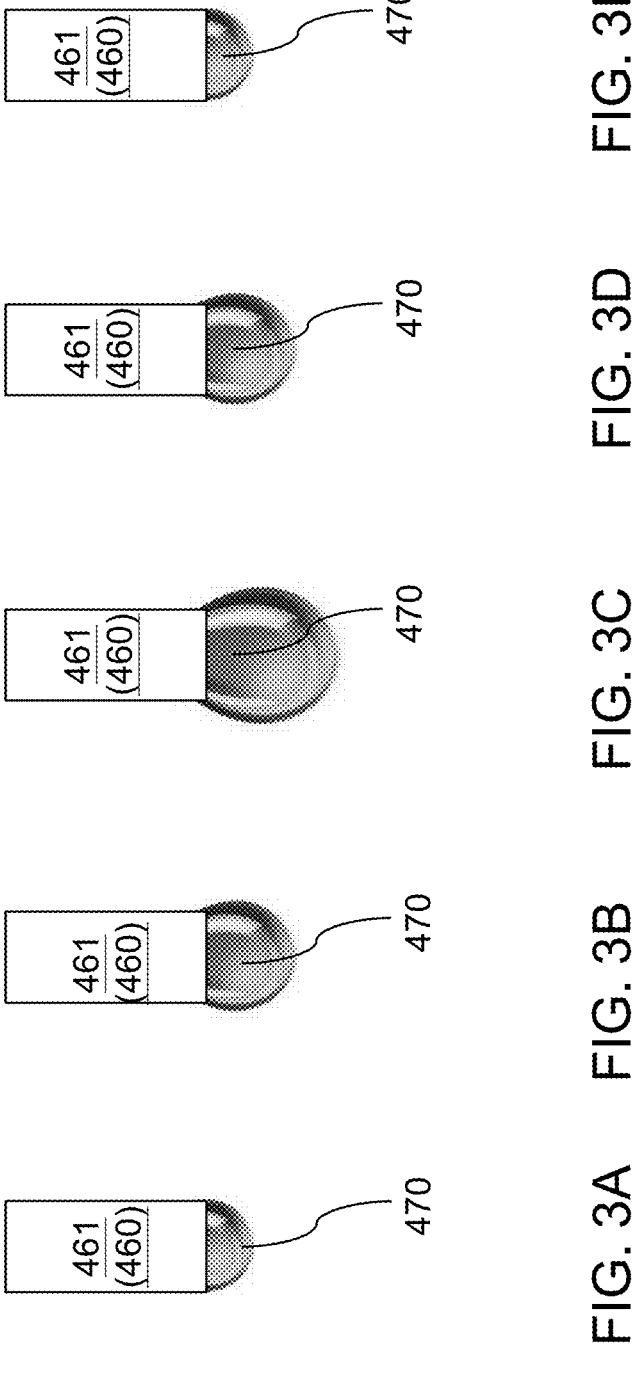
FIGS. 3A-3E illustrate a method of controlling the size of a droplet of the gel according to an embodiment of the present disclosure.

FIGS. 3A-3E illustrate a method of controlling the size of the droplet 470 of the gel according to an embodiment of the present disclosure. FIGS. 3A, 3B, and 3C schematically represent optical images of a droplet 470 that is sequentially taken by the optical image generation system 510. Various parameters, such as a terminal output flow rate, a maximum vertical dimension for the droplets 470, a maximum lateral dimension for the droplets 470, and a time period between success fall-offs of the droplets 470, may be estimated from a series of optical images such as the optical images schematically represented by FIGS. 3A, 3B, and 3C. For example, the terminal output flow rate may be estimated by calculating the volumes of the droplets 470 in the optical images. In instances in which the estimated terminal output flow rate is greater than the target value for the terminal output flow rate, the initial gel supply rate of the gel may be decreased or the diverted flow rate of the gel may be increased. In instances in which the correction to the terminal output flow rate is optimal, a measured value for the terminal output flow rate will change close to the target value. In instances in which the correction to the terminal output flow rate is excessive, a reduction in the size of the droplet 470 in time may result as illustrated in FIGS. 3D and 3E, which corresponds to a negative terminal output flow rate, i.e., a condition in which the diverted flow rate of the gel is greater than the initial gel supply rate.

Figure 4A:
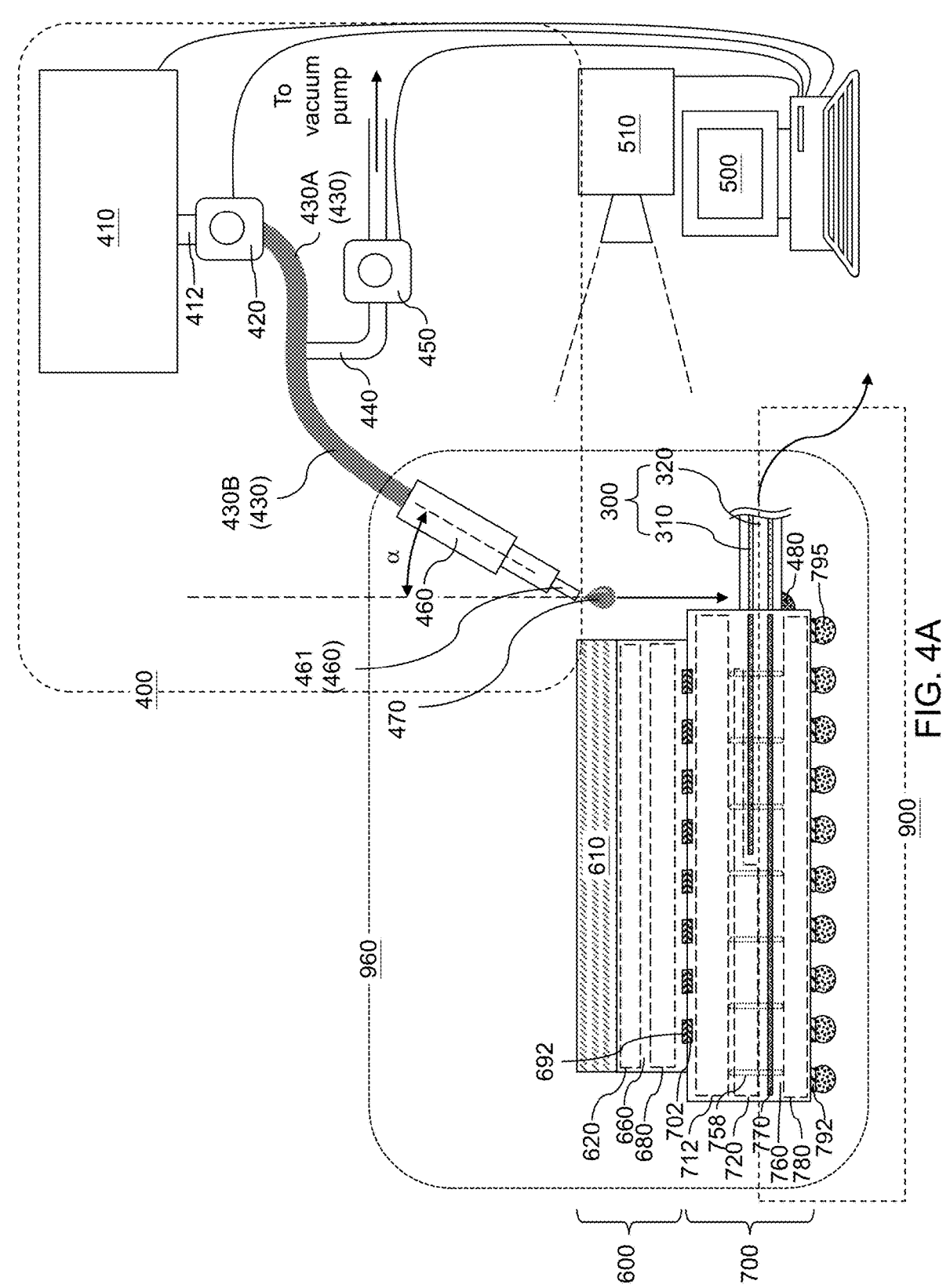
FIG. 4A illustrates a third configuration for operating the fiber-to-die attachment apparatus of the present disclosure.
Figure 4B:
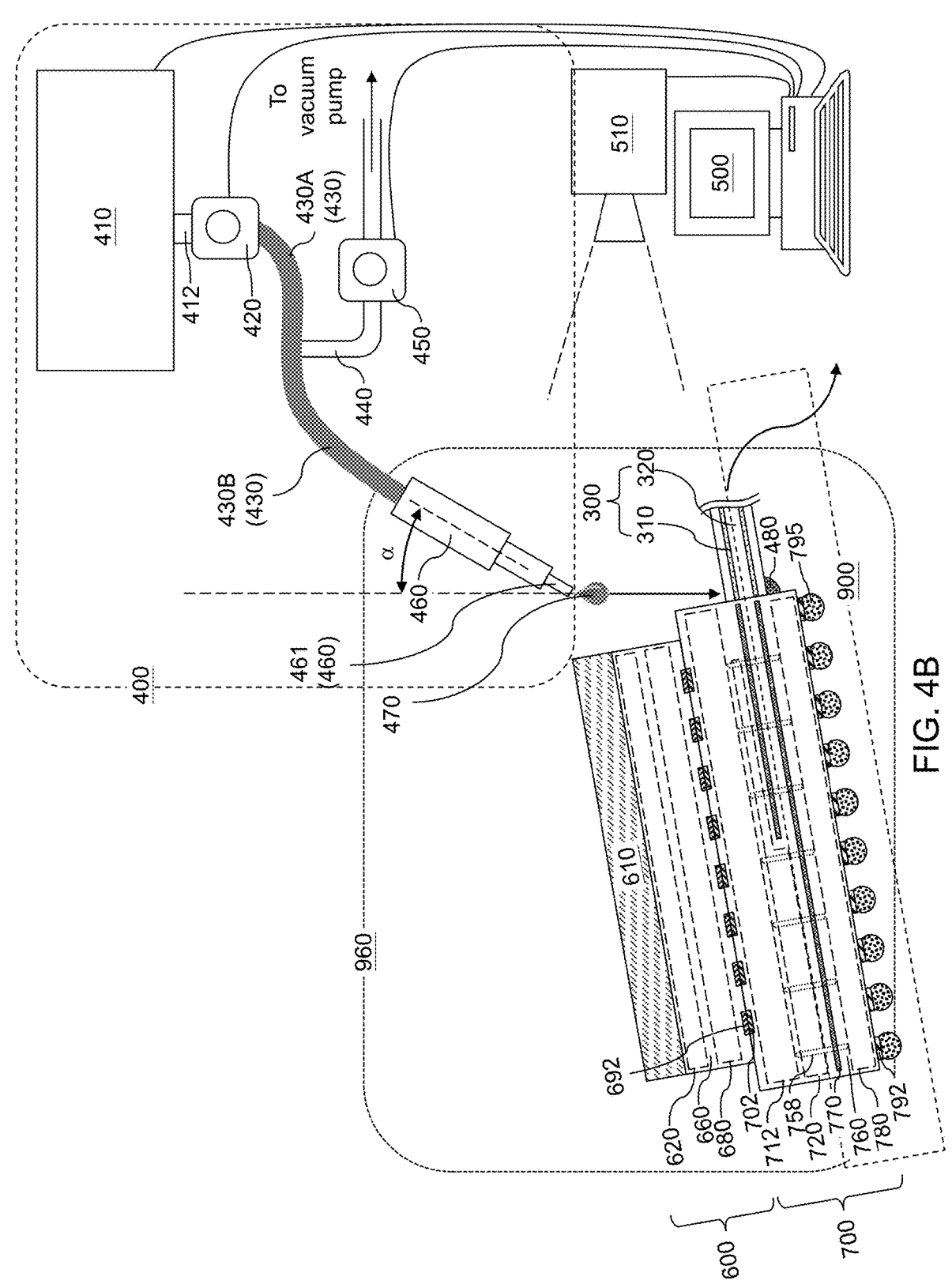
FIG. 4B illustrates a fourth configuration for operating the fiber-to-die attachment apparatus of the present disclosure.

Referring to FIGS. 4A and 4B, a third configuration and a fourth configuration for operating the fiber-to-die attachment apparatus of the present disclosure is illustrated. The third and the fourth configurations may be derived from the first and the second configurations, respectively, by tilting the dispensation tip 461 by a non-zero tilt angle a with respect to the vertical direction. Generally, the dispensation tip 461 may be held along a vertical direction as illustrated in FIGS. 2A and 2B, or may be held with a non-zero tilt angle a with respect to the vertical direction as illustrated in FIGS. 4A and 4B. The value of the non-zero tilt angle a may be in a range from 0.01 degree to 89 degrees, such as from 3 degrees to 45 degrees.

In the third configuration illustrated in FIG. 4A, the Euclidean plane including the interface between the PIC die 700 and the FAU 300 is vertical. In the fourth configuration illustrated in FIG. 4B, the Euclidean plane is tilted relative to the direction of the local effective gravitational field, which is hereafter referred to as a vertical direction. The tilt angle of the Euclidean plane relative to the vertical direction may be in a range from 0.01 degree to 60 degrees, such as from 3 degrees to 30 degrees, although lesser and greater tilt angles may also be used. The fiber-to-die attachment apparatus in the third or fourth configuration may be operated in the same manner as the first or second configuration of the fiber-to-die attachment apparatus.

Figure 5A:
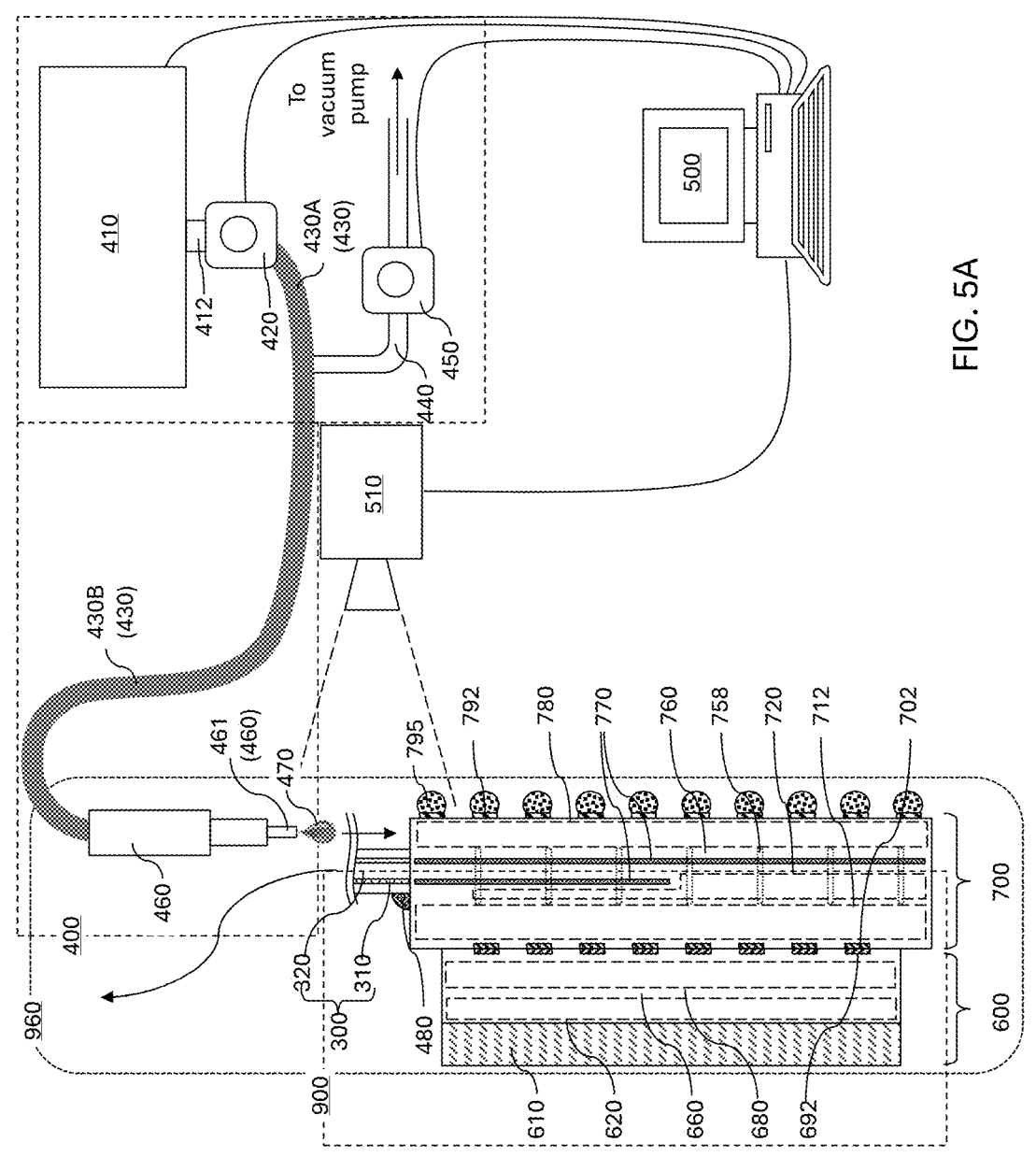
FIG. 5A illustrates a fifth configuration for operating the fiber-to-die attachment apparatus of the present disclosure.
Figure 5B:
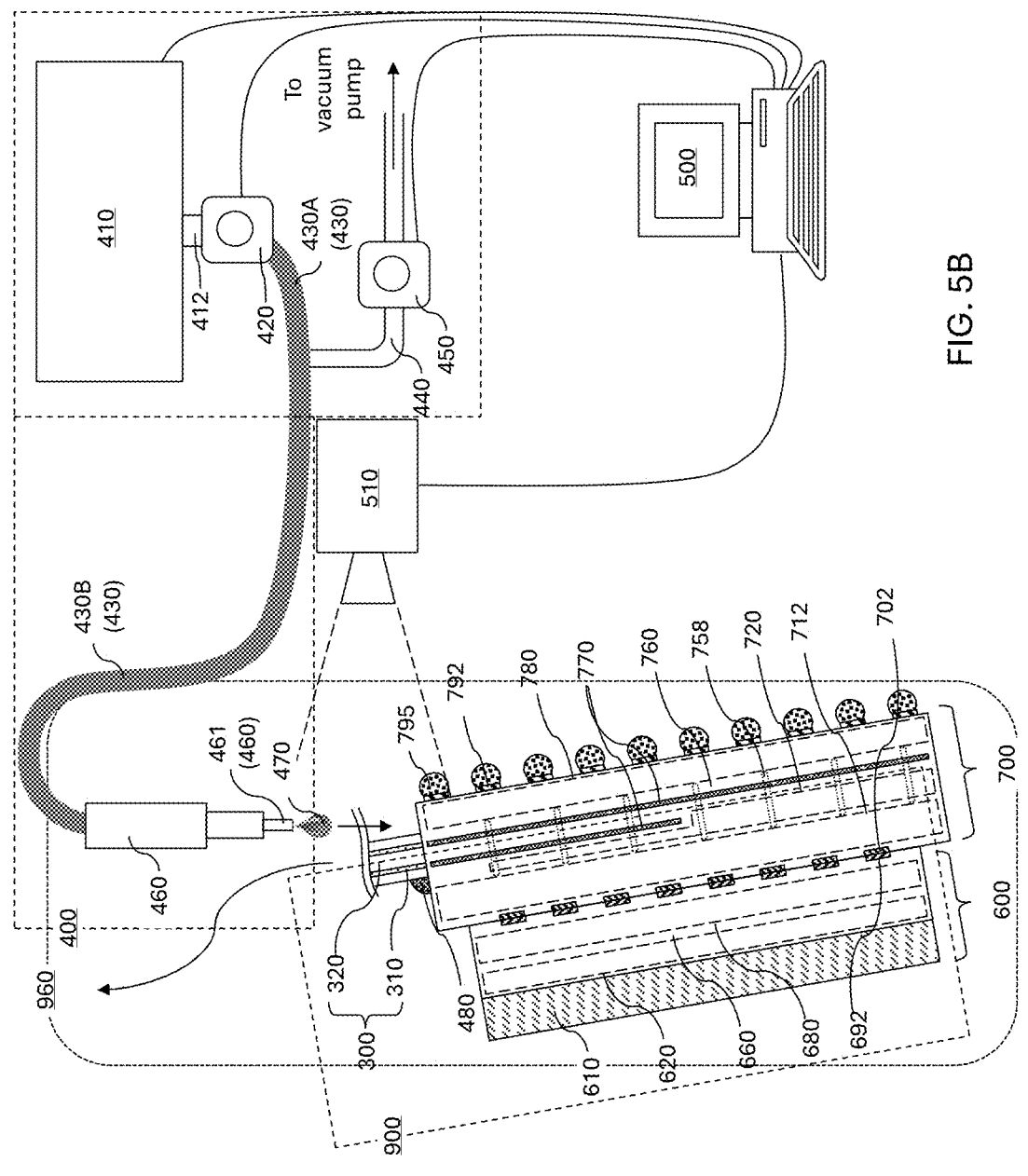
FIG. 5B illustrates a sixth configuration for operating the fiber-to-die attachment apparatus of the present disclosure.

Referring to FIGS. 5A and 5B, a fifth configuration and a sixth configuration for operating the fiber-to-die attachment apparatus of the present disclosure is illustrated. Generally, the Euclidean plane including the interface between the PIC die 700 and the FAU 300 may be horizontal as illustrated in FIG. 5A, or may be tilted relative to a horizontal plane as illustrated in FIG. 5B. The horizontal plane may be any plane that is perpendicular to the vertical direction. The tilt angle of the Euclidean plane relative to the horizontal plane may be in a range from 0.01 degree to 60 degrees, such as from 3 degrees to 30 degrees, although lesser and greater tilt angles may also be used. The fiber-to-die attachment apparatus in the fifth or sixth configuration may be operated in the same manner as the first or second configuration of the fiber-to-die attachment apparatus.

Figure 6A:
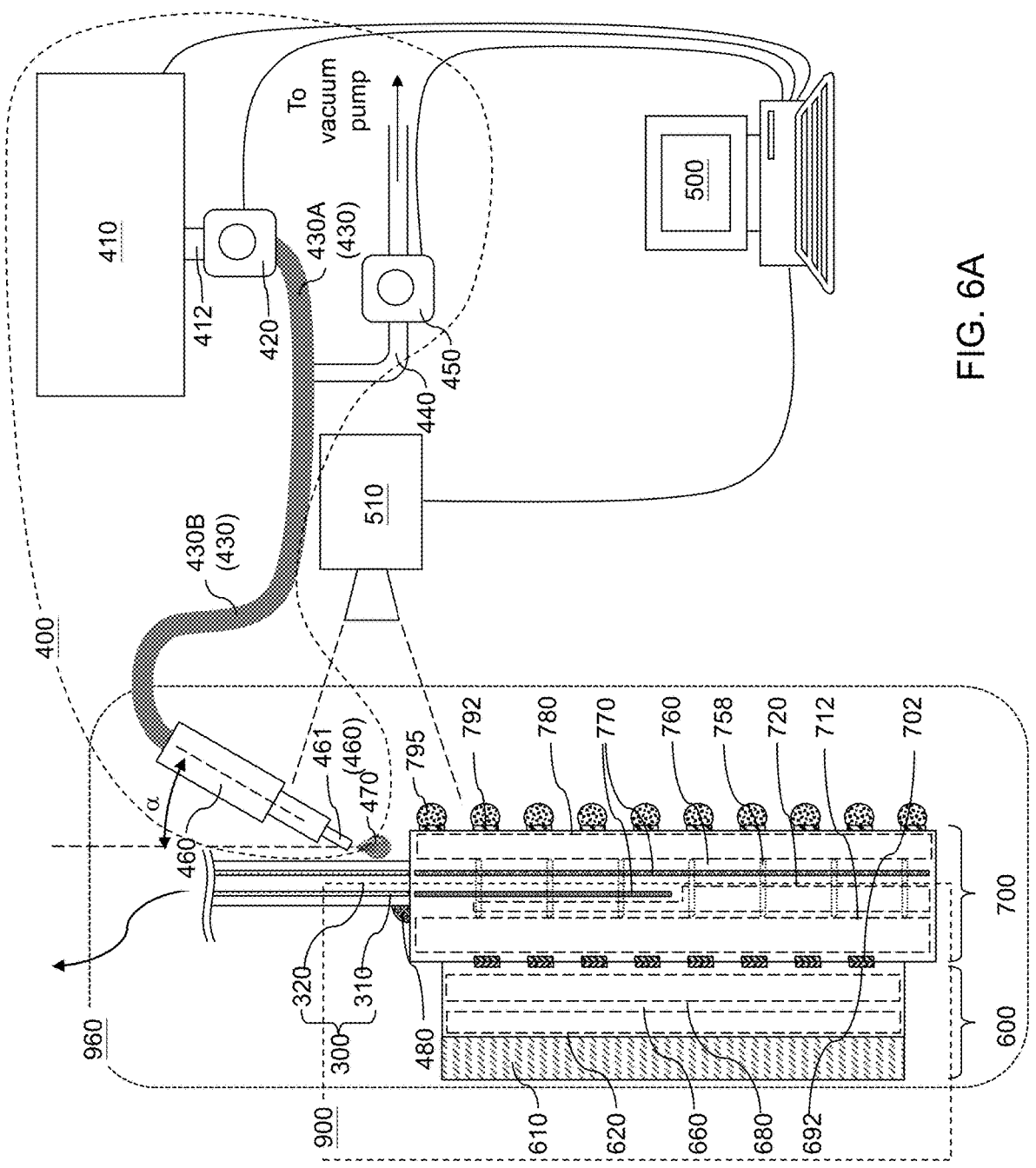
FIG. 6A illustrates a seventh configuration for operating a fiber-to-die attachment apparatus of the present disclosure.
Figure 6B:
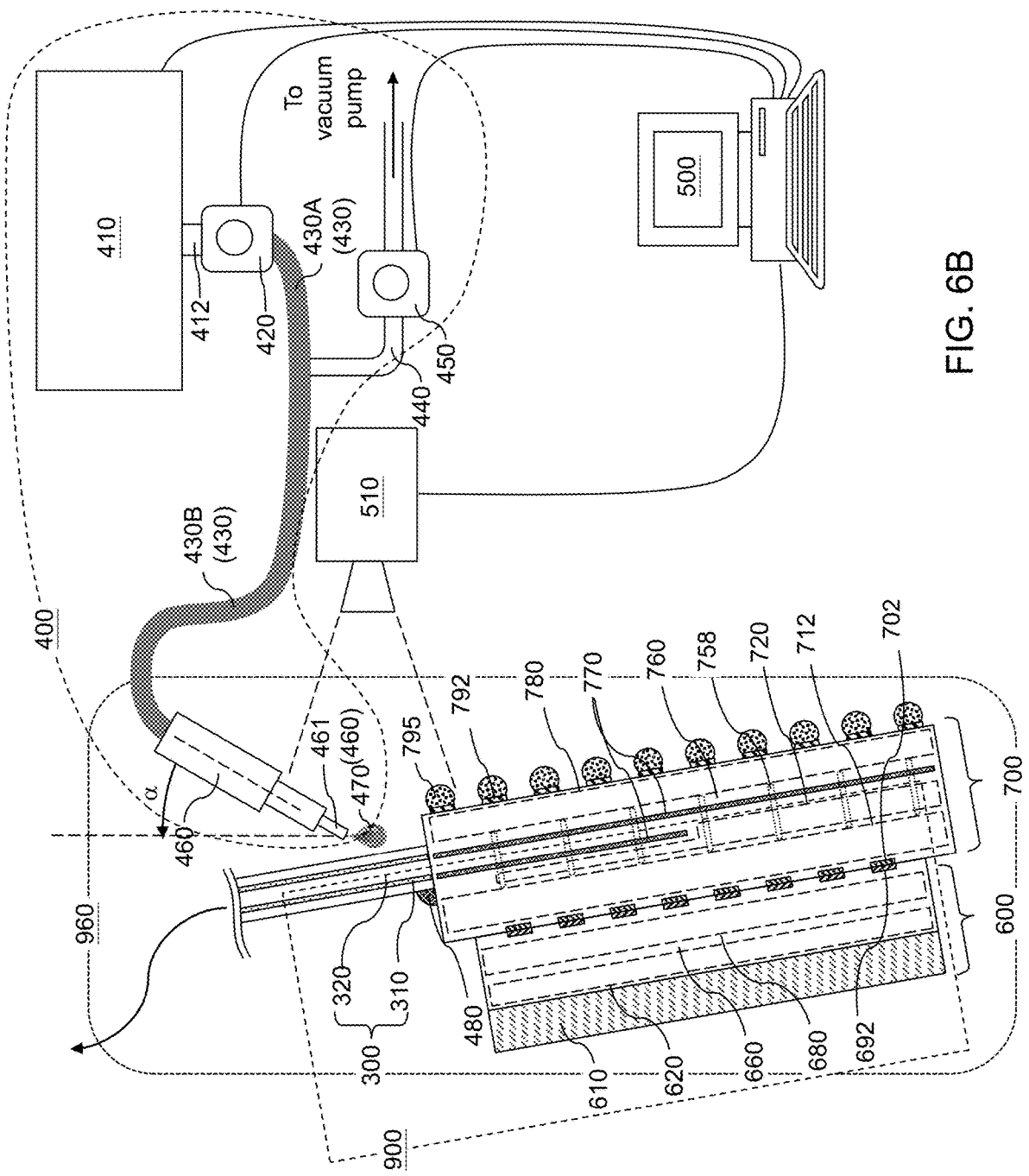
FIG. 6B illustrates an eighth configuration for operating the fiber-to-die attachment apparatus of the present disclosure.

Referring to FIGS. 6A and 6B, a seventh configuration and an eighth configuration for operating the fiber-to-die attachment apparatus of the present disclosure is illustrated. The seventh and the eighth configurations may be derived from the fifth and the sixth configurations, respectively, by tilting the dispensation tip 461 by a non-zero tilt angle a with respect to the vertical direction. Generally, the dispensation tip 461 may be held along a vertical direction as illustrated in FIGS. 5A and 5B, or may be held with a non-zero tilt angle a with respect to the vertical direction as illustrated in FIGS. 6A and 6B. The value of the non-zero tilt angle a may be in a range from 0.01 degree to 89 degrees, such as from 3 degrees to 45 degrees.

In the seventh configuration illustrated in FIG. 6A, the Euclidean plane including the interface between the PIC die 700 and the FAU 300 is horizontal. In the eighth configuration illustrated in FIG. 6B, the Euclidean plane is tilted relative to the horizontal direction. The tilt angle of the Euclidean plane relative to the horizontal direction may be in a range from 0.01 degree to 60 degrees, such as from 3 degrees to 30 degrees, although lesser and greater tilt angles may also be used. The fiber-to-die attachment apparatus in the seventh or eighth configuration may be operated in the same manner as the first or second configuration of the fiber-to-die attachment apparatus.

Figure 7:
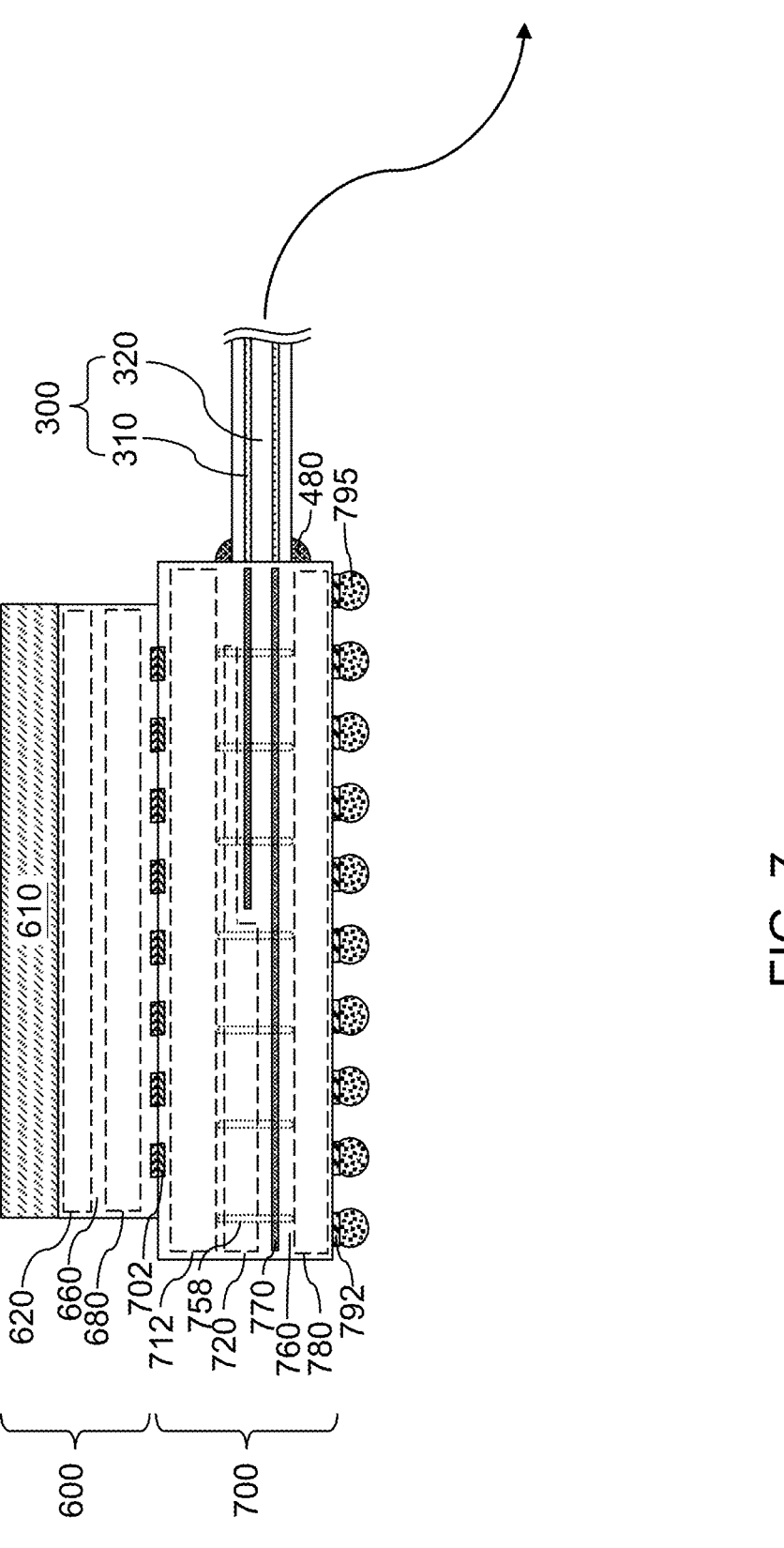
FIG. 7 is a vertical cross-sectional view of an assembly of an electronic integrated circuit (EIC) die, a PIC die, and an FAU according to an embodiment of the present disclosure.

Referring to FIG. 7, an assembly (600, 700, 300) of an electronic integrated circuit (EIC) die 600, a PIC die 700, and an FAU 300 is illustrated, which may be provided using any of the previously described configurations of the fiber-to-die attachment apparatus of the present disclosure.

Figure 8A:
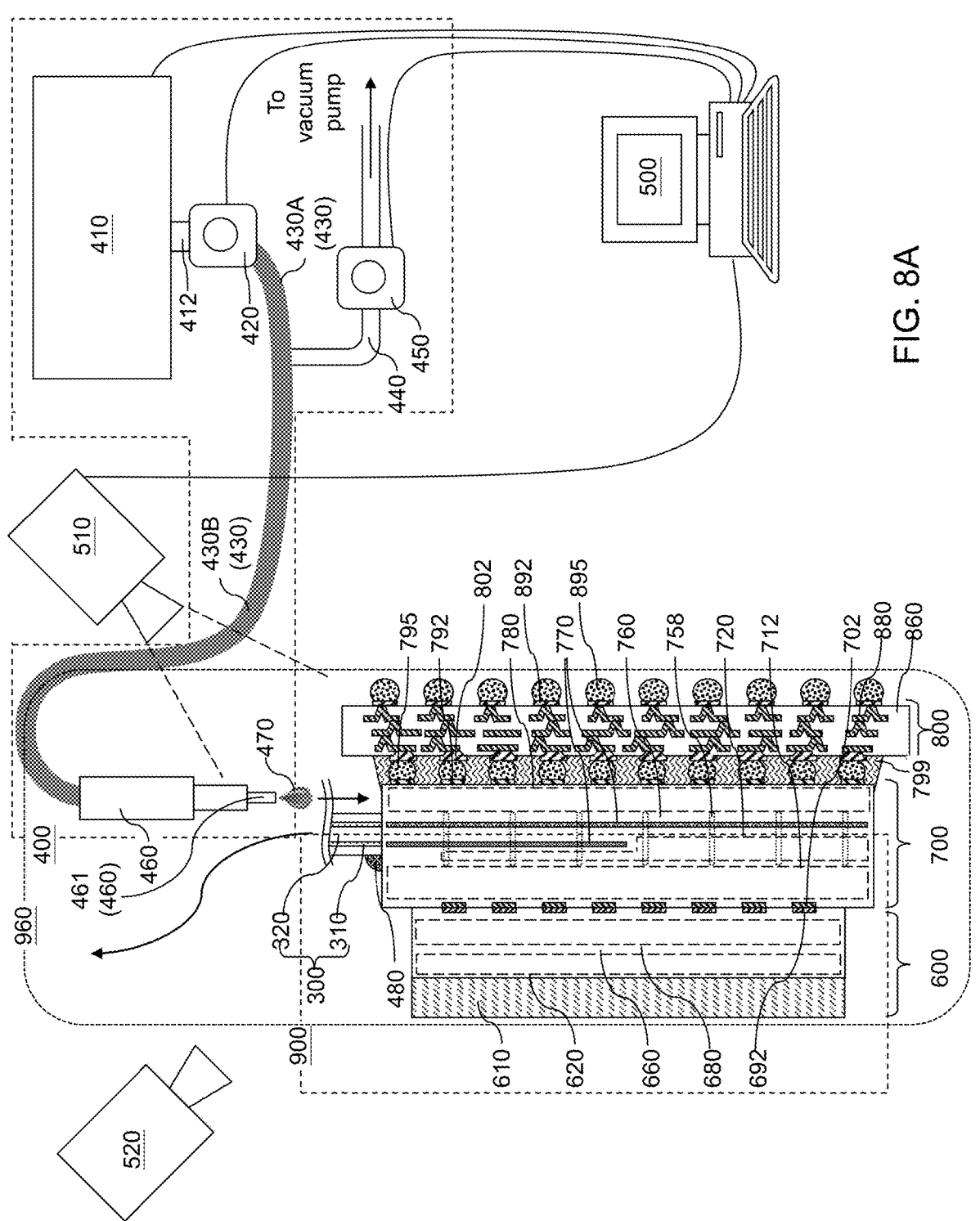
FIG. 8A illustrates a ninth configuration for operating the fiber-to-die attachment apparatus of the present disclosure.
Figure 8B:
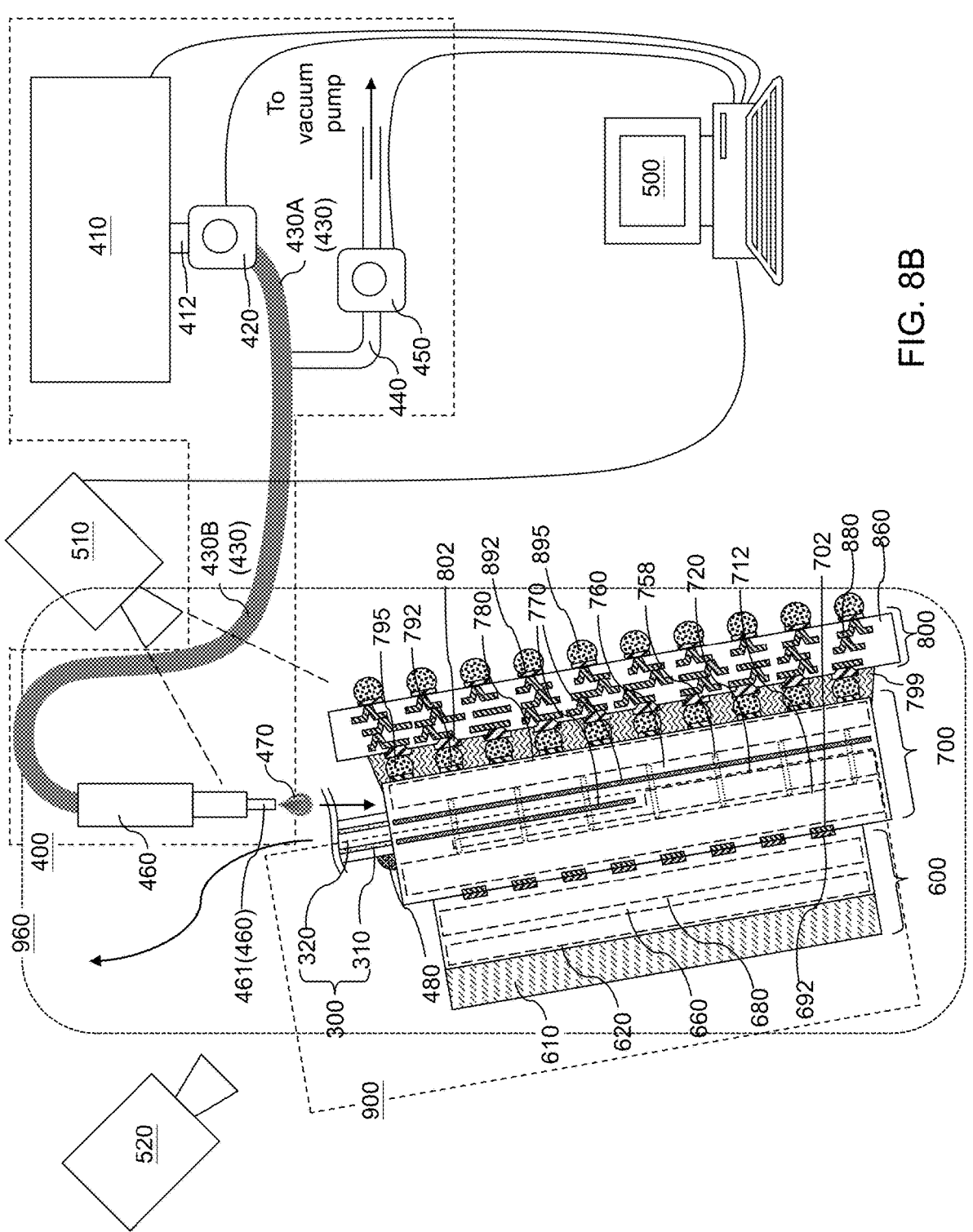
FIG. 8B illustrates a tenth configuration for operating the fiber-to-die attachment apparatus of the present disclosure.

Referring to FIGS. 8A and 8B, a ninth configuration and a tenth configuration for operating the fiber-to-die attachment apparatus of the present disclosure are illustrated, respectively. In the ninth configuration and the tenth configuration, the FAU 300 is attached to the PIC die 700 after the composite die (600, 700) is attached to an interposer 800.

The interposer 800 may comprise redistribution wiring interconnects 880 that are embedded within redistribution dielectric layers 860. Each of the redistribution dielectric layer 860 may comprise a respective dielectric polymer material such as polyimide (PI), benzocyclobutene (BCB), or polybenzobisoxazole (PBO). Other suitable dielectric polymer materials may also be used. The thickness of each redistribution dielectric layer 860 may be in a range from 2 microns to 40 microns, such as from 4 microns to 20 microns. Each of the redistribution wiring interconnects 880 may comprise a metallic seed layer and a metal layer (which may comprise, for example, copper, nickel, or copper and nickel). The thickness of each redistribution wiring interconnects 880 may be in a range from 2 microns to 40 microns, such as from 4 microns to 10 microns, although lesser or greater thicknesses may also be used. The redistribution wiring interconnects 880 provide various electrically conductive paths through the interposer 800.

The interposer 800 may comprise die-side bump structures 802 and package-side bump structures 892. The composite die (600, 700) is attached to the interposer 800 prior to attaching the FAU 300 to the PIC die 700. In one embodiment, the die-side bump structures 802 of the interposer 800 may be bonded to the on-die bump structures 792 on the PIC die 700 through the array of first solder material portions 795. A first underfill material portion 799 may be formed around the array of first solder material portions 795. An array of second solder material portions 895 may be attached to the package-side bump structures 892.

The ninth configuration and the tenth configuration of the fiber-to-die attachment apparatus may be the same as the fifth and sixth configuration of the fiber-to-die attachment apparatus described above except for the difference of using an assembly of a composite die (600, 700) and an interposer 800 in lieu of a composite die (600, 700). Optionally, an additional optical image generation system 520 may be used to assist in monitoring formation of the encasement gel structure 480.

Generally, the Euclidean plane including the interface between the PIC die 700 and the FAU 300 may be horizontal as illustrated in FIG. 8A, or may be tilted relative to a horizontal plane as illustrated in FIG. 8B. The horizontal plane may be any plane that is perpendicular to the vertical direction. The tilt angle of the Euclidean plane relative to the horizontal plane may be in a range from 0.01 degree to 60 degrees, such as from 3 degrees to 30 degrees, although lesser and greater tilt angles may also be used. The fiber-to-die attachment apparatus in the fifth or sixth configuration may be operated in the same manner as the first or second configuration of the fiber-to-die attachment apparatus.

Figure 9A:
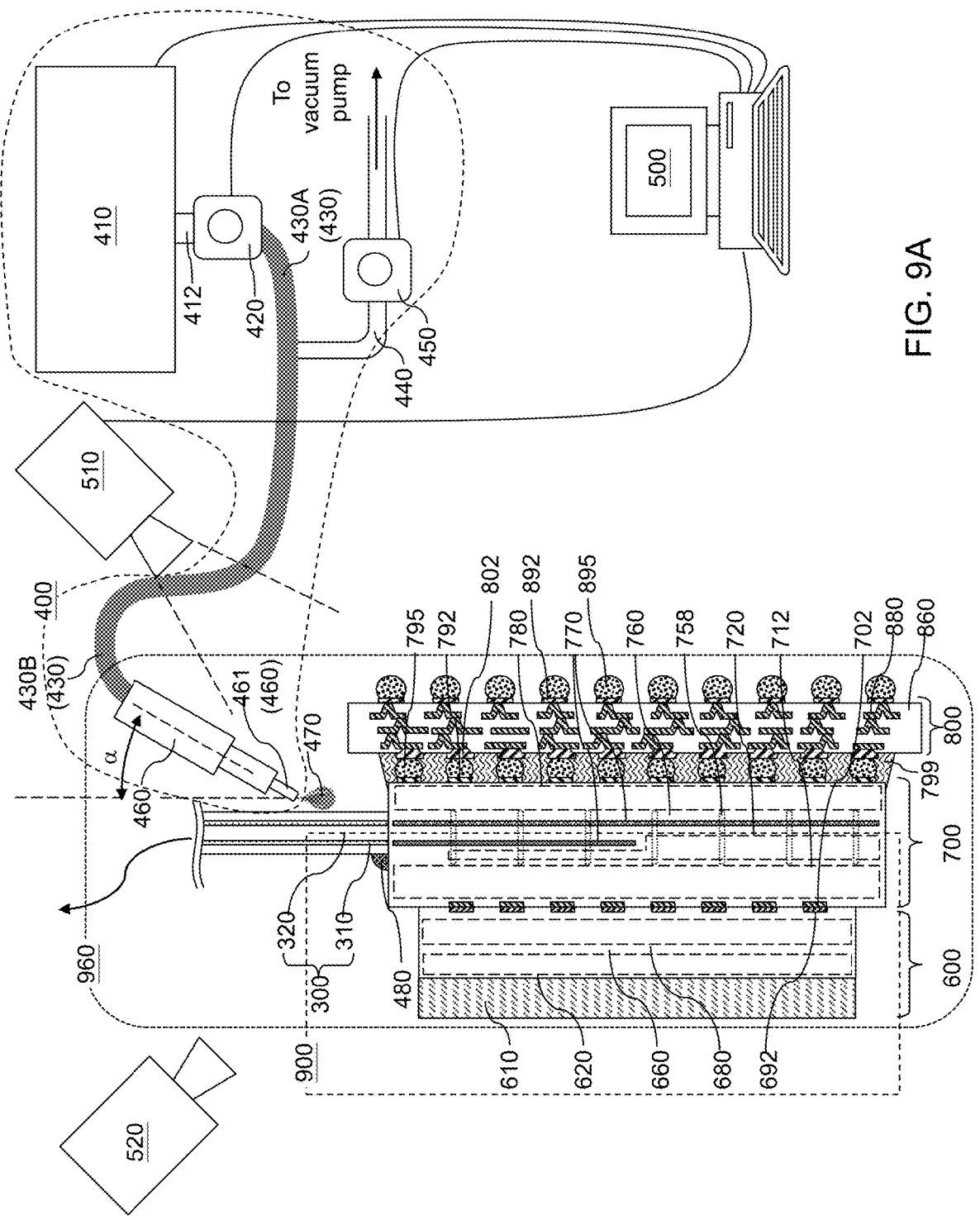
FIG. 9A illustrates an eleventh configuration for operating a fiber-to-die attachment apparatus of the present disclosure.
Figure 9B:
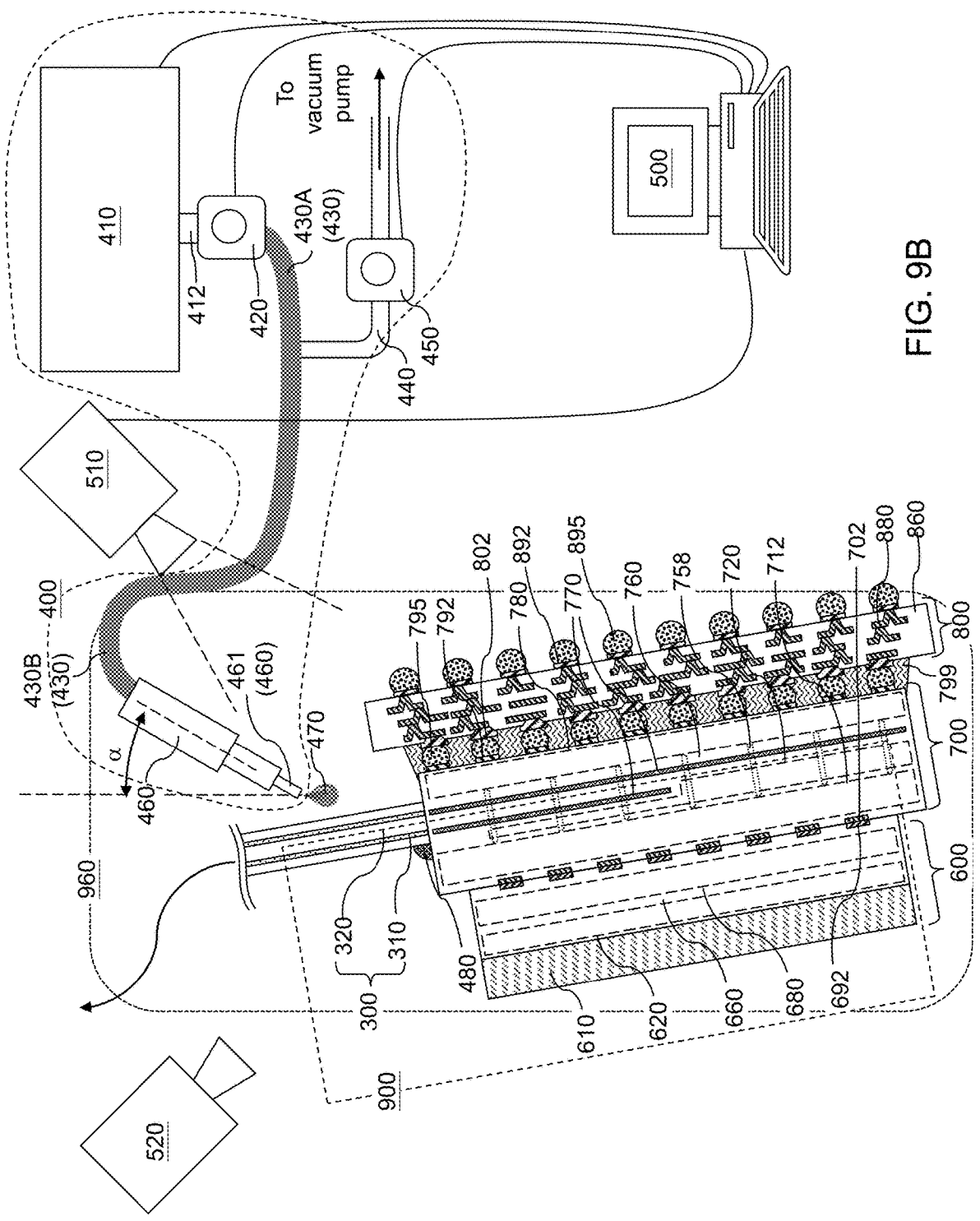
FIG. 9B illustrates a twelfth configuration for operating the fiber-to-die attachment apparatus of the present disclosure.

Referring to FIGS. 9A and 9B, an eleventh configuration and a twelfth configuration of the fiber-to-die attachment apparatus are illustrated, respectively. The eleventh configuration and the twelfth configuration of the fiber-to-die attachment apparatus may be the same as the seventh and eighth configuration of the fiber-to-die attachment apparatus described above except for the difference of using an assembly of a composite die (600, 700) and an interposer 800 in lieu of a composite die (600, 700). Optionally, an additional optical image generation system 520 may be used to assist in monitoring formation of the encasement gel structure 480.

Alternatively, the eleventh and the twelfth configurations may be derived from the ninth and the tenth configurations, respectively, by tilting the dispensation tip 461 by a non-zero tilt angle a with respect to the vertical direction. Generally, the dispensation tip 461 may be held along a vertical direction as illustrated in FIGS. 8A and 8B, or may be held with a non-zero tilt angle a with respect to the vertical direction as illustrated in FIGS. 9A and 9B. The value of the non-zero tilt angle a may be in a range from 0.01 degree to 89 degrees, such as from 3 degrees to 45 degrees.

In the eleventh configuration illustrated in FIG. 9A, the Euclidean plane including the interface between the PIC die 700 and the FAU 300 is horizontal. In the twelfth configuration illustrated in FIG. 9B, the Euclidean plane is tilted relative to the horizontal direction. The tilt angle of the Euclidean plane relative to the horizontal direction may be in a range from 0.01 degree to 60 degrees, such as from 3 degrees to 30 degrees, although lesser and greater tilt angles may also be used. The fiber-to-die attachment apparatus in the seventh or eighth configuration may be operated in the same manner as the first or second configuration of the fiber-to-die attachment apparatus.

Figure 10:
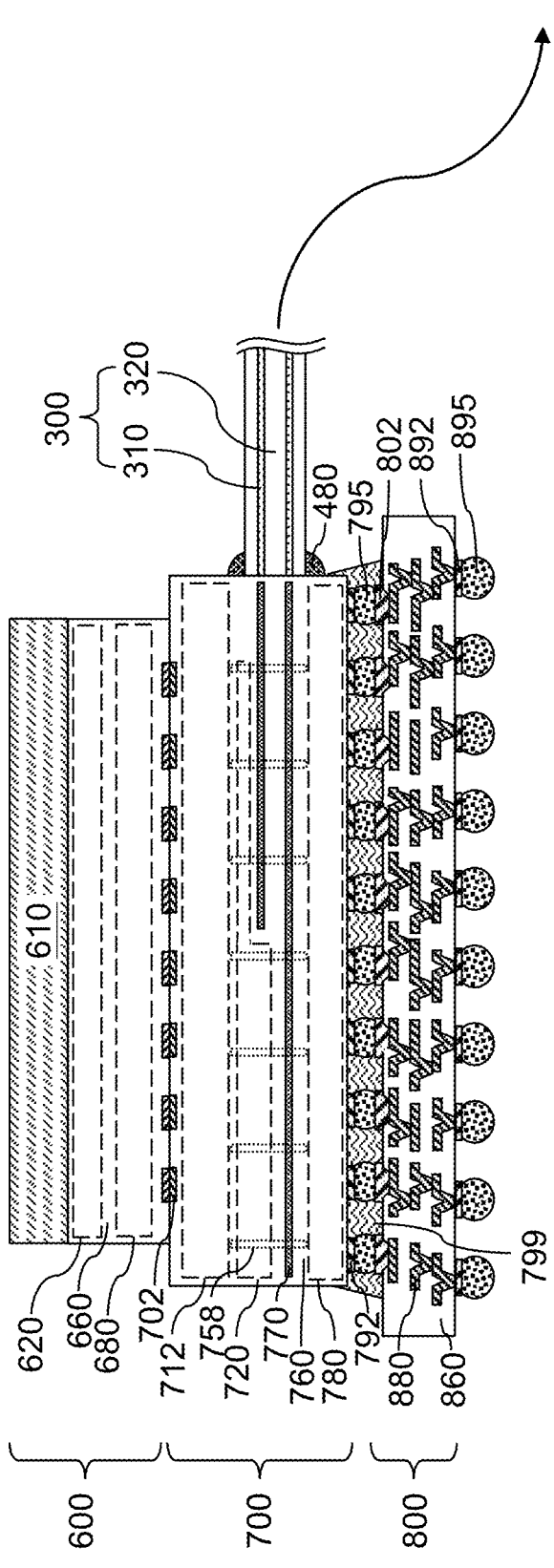
FIG. 10 is a vertical cross-sectional view of an assembly of an EIC die, a PIC die, an FAU, and an interposer according to an embodiment of the present disclosure.

Referring to FIG. 10, a bonded assembly (600, 700, 800, 300) of a composite die (600, 700), a FAU 300, and an interposer 800 is illustrated. The bonded assembly (600, 700, 800, 300) may be formed by using any of the ninth, tenth, eleventh, and twelfth configuration of the fiber-to-die attachment apparatus as described with reference to FIGS. 8A, 8B, 9A, and 9B. Alternatively, the bonded assembly (600, 700, 800, 300) illustrated in FIG. 10 may be derived from the assembly (600, 700, 300) of the die 600, the PIC die 700, and the FAU 300 described with reference to FIG. 7 by attaching an interposer 800. In this embodiment, the die-side bump structures 802 of the interposer 800 may be bonded to the on-die bump structures 792 on the assembly (600, 700, 300) of the die 600, the PIC die 700, and the FAU 300 through an array of first solder material portions 795. A first underfill material portion 799 may be formed around the array of first solder material portions 795. An array of second solder material portions 895 may be attached to the package-side bump structures 892.

Figure 11:
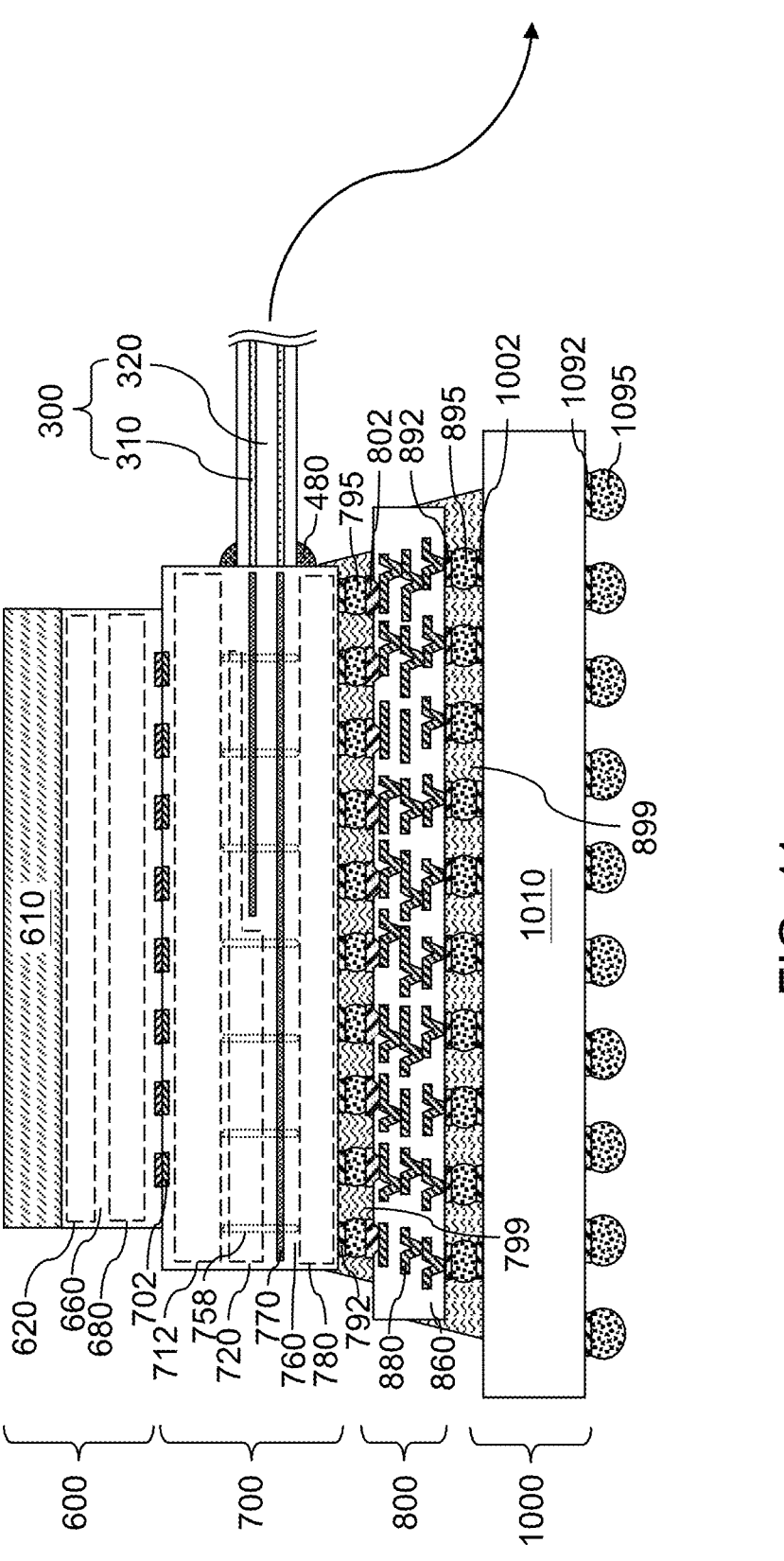
FIG. 11 is a vertical cross-sectional view of an assembly of an EIC die, a PIC die, an FAU, an interposer, and a packaging substrate according to an embodiment of the present disclosure.

Referring to FIG. 11, the bonded assembly (600, 700, 800, 300) of a composite die (600, 700), a FAU 300, and an interposer 800 may be attached to a packaging substrate 1000. The packaging substrate 1000 may comprise a substrate body 1010 including various electrically conductive paths embedded within at least one insulating layer, first bonding pads 1002 located on one side of the substrate body 1010, and second bonding pads 1092 located on another side of the substrate body 1010.

Generally, the packaging substrate 1000 may be a cored packaging substrate, or a coreless packaging substrate that does not include a package core. Alternatively, the packaging substrate 1000 may include a system-on-integrated packaging substrate (SoIS) including redistribution layers, dielectric interlayers, and/or at least one embedded interposer (such as a silicon interposer). Such a system-integrated packaging substrate may include layer-to-layer interconnections using solder material portions, microbumps, underfill material portions (such as molded underfill material portions), and/or an adhesion film. The packaging substrate 1000 may include board-side surface laminar circuit (SLC) and/or a chip-side surface laminar circuit.

The array of second solder material portions 895 may be bonded to the first bonding pads 1002 of the packaging substrate 1000. A second underfill material portion 899 may be formed around the array of second solder material portions 895. Solder balls 1095 may be attached to the second bonding pads 1092 of the packaging substrate 1000.

FIG. 12 is a first flowchart illustrating general processing steps for forming a photonic assembly of the present disclosure. The method of the first flowchart may be used to attach a fiber array unit (FAU) 300 to a photonic integrated circuit (PIC) die 700.

Referring to step 1210 and FIGS. 2A, 2B, 4A, 4B, 5A, 5B, 6A, 6B, 8A, 8B, 9A, and 9B, an end surface of the FAU 300 may be disposed on a surface of the PIC die 700 that contains, or is proximal to, end surfaces of waveguides with the PIC die 700.

Referring to step 1220 and FIGS. 2A, 2B, 4A, 4B, 5A, 5B, 6A, 6B, 8A, 8B, 9A, and 9B, a gel dispensation apparatus 400 may be provided, which may include a first gel supply line 430A configured to provide a supply flow of a gel at an initial gel supply rate, a vacuum line 440 providing a controlled vacuum suction to an end portion of the first gel supply line 430A and diverting a fraction of the supply flow to a vacuum pump at a diverted flow rate, and a second gel supply line 430B that is connected to the end portion of the first gel supply line 430A and is configured to flow a remainder of the supply flow at a terminal output flow rate toward a dispensation tip 461 of the gel dispensation apparatus 400. The terminal output flow rate is the initial gel supply rate less the diverted flow rate.

Referring to step 1230 and FIGS. 2A, 2B, 4A, 4B, 5A, 5B, 6A, 6B, 8A, 8B, 9A, and 9B, the gel may be dispensed around, and onto, a periphery of an interface between the end surface of FAU 300 and the surface of the PIC die 700.

Referring to step 1240 and FIGS. 2A, 2B, 4A, 4B, 5A, 5B, 6A, 6B, 8A, 8B, 9A, and 9B, a dispensed portion of the gel around the periphery of the interface (i.e., the encasement gel structure 480) may be cured, for example, by waiting at room temperature or at an elevated temperature (which may be in a range between room temperature and 300 degrees Celsius). The FAU 300 is thus attached to the PIC die 700.

FIG. 13 is a second flowchart illustrating general processing steps for forming a photonic assembly of the present disclosure. The method of the second flowchart may be used to attach a fiber array unit (FAU) 300 to a photonic integrated circuit (PIC) die 700.

Referring to step 1310 and FIGS. 2A, 2B, 4A, 4B, 5A, 5B, 6A, 6B, 8A, 8B, 9A, and 9B, an end surface of the FAU 300 may be disposed on a surface of the PIC die 700 that contains, or is proximal to, end surfaces of waveguides with the PIC die 700.

Referring to step 1320 and FIGS. 2A, 2B, 4A, 4B, 5A, 5B, 6A, 6B, 8A, 8B, 9A, and 9B, a gel dispensation apparatus 400 configured to flow a stream of a gel at a terminal output flow rate out of a dispensation tip 461 may be provided.

Referring to step 1330 and FIGS. 2A, 2B, 4A, 4B, 5A, 5B, 6A, 6B, 8A, 8B, 9A, and 9B, the dispensation tip 461 may be disposed directly above a segment of the interface.

Referring to step 1340 and FIGS. 2A, 2B, 4A, 4B, 5A, 5B, 6A, 6B, 8A, 8B, 9A, and 9B, the gel may be dispensed around, and onto, a periphery of an interface between the end surface of FAU 300 and the surface of the PIC die 700 by inducing droplets 470 of the gel to fall onto the periphery of the interface by gravity while generating optical images of the droplets 470 around the dispensation tip 461 of the gel dispensation apparatus 400, and by adjusting the terminal output flow rate of the gel from the dispensation tip 461 based on data generated from the optical images.

Referring to step 1350 and FIGS. 2A, 2B, 4A, 4B, 5A, 5B, 6A, 6B, 8A, 8B, 9A, and 9B, a dispensed portion of the gel around the periphery of the interface may be cured. Thus, the FAU 300 is attached to the PIC die 700.

FIG. 14 is a third flowchart illustrating general processing steps for forming a photonic assembly of the present disclosure. The method of the third flowchart may be used to attach a fiber array unit (FAU) 300 to a photonic integrated circuit (PIC) die 700.

Referring to step 1410 and FIGS. 2A, 2B, 4A, 4B, 5A, 5B, 6A, 6B, 8A, 8B, 9A, and 9B, an end surface of a fiber array unit (FAU) 300 may be disposed on a surface of a photonic integrated circuit (PIC) die 700.

Referring to step 1420 and FIGS. 2A, 2B, 4A, 4B, 5A, 5B, 6A, 6B, 8A, 8B, 9A, and 9B, a gel dispensation apparatus 400 is provided, which includes a first gel supply line 430A having a first flow control valve 420 and connected to a gel supply source 410, a vacuum line 440 having a second flow control valve 450, and a second gel supply line 430B that is connected to a dispensation tip 461. Input orifices of the second gel supply line 430B and the vacuum line 440 are connected to an output orifice of the first gel supply line 430A such that a terminal output flow rate of a portion of the gel that flows through the second gel supply line 430B is a difference between an initial gel supply rate of a flow of the gel through the first gel supply line 430A less a diverted flow rate of a fraction of the gel that flows through the vacuum line 440. Referring to step 1430 and FIGS. 2A, 2B, 4A, 4B, 5A, 5B, 6A, 6B, 8A, 8B, 9A, and 9B, the gel may be dispensed around, and onto, a periphery of an interface between the end surface of FAU 300 and the surface of the PIC die 700 by inducing droplets 470 of the gel to fall onto the periphery of the interface by gravity while generating optical images of the droplets 470 around the dispensation tip 461 of the gel dispensation apparatus 400, and by adjusting the terminal output flow rate of the gel from the dispensation tip 461.

The three flowcharts shown in FIGS. 12, 13, and 14 do not represent three different inventions or three different methods of attaching a fiber array unit (FAU) 300 to a photonic integrated circuit (PIC) die 700. Rather, the three flowcharts shown in FIGS. 12, 13, and 14 illustrate exemplary combinations of features that may be manifested during a same processing scheme for attaching an FAU 300 to a PIC die 700. Thus, it is possible to use all of the features described in the three flowcharts, to use only common features from the three flowcharts, or to selectively use features in one or more of the flowcharts.

Referring to all drawings and according to various embodiments of the present disclosure, a method of attaching fiber array unit (FAU) 300 to a photonic integrated circuit (PIC) die 700 may be provided, the method may include the steps of: disposing an end surface of a fiber array unit (FAU) 300 on a surface of a photonic integrated circuit (PIC) die 700; providing a gel dispensation apparatus 400 including a first gel supply line 430A having a first flow control valve 420 and connected to a gel supply source 410, a vacuum line 440 having a second flow control valve 450, and a second gel supply line 430B that may be connected to a dispensation tip 461, wherein input orifices of the second gel supply line 430B and the vacuum line 440 may be connected to an output orifice of the first gel supply line 430A such that a terminal output flow rate of a portion of the gel that flows through the second gel supply line 430B is a difference between an initial gel supply rate of a flow of the gel through the first gel supply line less a diverted flow rate of a fraction of the gel that flows through the vacuum line 440; and dispensing the gel around, and onto, a periphery of an interface between the end surface of FAU 300 and the surface of the PIC die 700 by inducing droplets of the gel to fall onto the periphery of the interface by gravity while generating optical images of the droplets around the dispensation tip 461 of the gel dispensation apparatus 400, and by adjusting the terminal output flow rate of the gel from the dispensation tip 461.

In one embodiment, the dispensation tip 461 may be positioned directly above, and is aligned along a vertical direction to, a segment of the interface while dispensing the gel; the vertical direction is defined by a direction of a local effective gravitational field; and the gel is dispensed in discrete droplets that fall downward along the direction of the local effective gravitational field. In one embodiment, the method may further include the steps of: generating optical images of droplets of the gel around the dispensation tip of the gel dispensation apparatus; determining a maximum vertical dimension of the droplets before fall-off by analyzing the optical images using a computer and an image analysis program; and adjusting the terminal output flow rate based on measured values of the maximum vertical dimension. In one embodiment, the method may further include the steps of: determining a maximum lateral dimension of the droplets before the fall-off by analyzing the optical images using the computer and the image analysis program; and adjusting the terminal output flow rate based on measured values of the maximum lateral dimension. In one embodiment, the method may further include the steps of: generating optical images of droplets of the gel around the dispensation tip 461 of the gel dispensation apparatus 400; determining a periodicity of fall-off times of the droplets by analyzing the optical images using a computer and an image analysis program; and adjusting the terminal output flow rate based on measured values of the periodicity of the fall-off times. In one embodiment, the method may further include the steps of: generating optical images of droplets of the gel around the dispensation tip 461 of the gel dispensation apparatus 400; calculating an estimated data value for the terminal output flow rate by analyzing the optical images of the droplets; and increasing or decreasing the terminal output flow rate through the dispensation tip 461 based on the estimated data value for the terminal output flow rate. In one embodiment, the estimated data value for the terminal output flow rate is calculated by: calculating maximum volumes for the droplets before fall-off by analyzing the optical images using a computer and an image analysis program; calculating time periods between success events of the fall-off of the droplets; and dividing a sum of the maximum volumes by the sum of the time periods. In one embodiment, the method may further include the steps of: generating optical images of droplets of the gel around the dispensation tip 461 of the gel dispensation apparatus 400; determining, using a processor and an image analysis program that analyzes the optical images, whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets; and increasing or decreasing the terminal output flow rate in response to determining that the at least one measurement parameter is out of the respective specification range. In one embodiment, increasing the terminal output flow rate may be effected by increasing the initial gel supply rate of the gel; and decreasing the terminal output flow rate may be effected by decreasing the initial gel supply rate of the gel. In one embodiment, increasing the terminal output flow rate may be effected by decreasing the diverted flow rate of the gel; and decreasing the terminal output flow rate may be effected by increasing the diverted flow rate of the gel.

Referring to all drawings and according to various embodiments of the present disclosure, an additional embodiment is drawn to a method of attaching fiber array unit (FAU) 300 to a photonic integrated circuit (PIC) die 700, the method may include the steps of: disposing an end surface of the FAU 300 on a surface of the PIC die 700 that contains, or is proximal to, end surfaces of waveguides 770 with the PIC die 700; providing a gel dispensation apparatus 400 configured to flow a stream of a gel at a terminal output flow rate out of a dispensation tip 461; disposing the dispensation tip 461 directly above a segment of the interface; dispensing the gel around, and onto, a periphery of an interface between the end surface of FAU 300 and the surface of the PIC die 700 by inducing droplets of the gel to fall onto the periphery of the interface by gravity while generating optical images of the droplets around the dispensation tip of the gel dispensation apparatus, and by adjusting the terminal output flow rate of the gel from the dispensation tip 461 based on data generated from the optical images; and curing a dispensed portion of the gel around the periphery of the interface, whereby the FAU 300 may be attached to the PIC die 700.

In one embodiment, the method may also include the steps of: determining, using a processor 500 and an image analysis program that analyzes the optical images, whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets; and increasing or decreasing the terminal output flow rate in response to determining that the at least one measurement parameter is out of the respective specification range. In one embodiment, the method may also include the steps of: tilting an assembly of the PIC die 700 and the FAU 300 such that a Euclidean plane containing the interface between the end surface of FAU 300 and the surface of the PIC die 700 may be tilted relative to a direction of a local effective gravitational field by a non-zero tilt angle. In an embodiment, the gel dispensation apparatus 400 may include: a first gel supply line 430A configured to receive an influx of the gel from a gel supply source 410 and to provide a supply flow of the gel at an initial gel supply rate; a vacuum line 440 providing a controlled vacuum suction to an end portion of the first gel supply line and diverting a fraction of the supply flow to a vacuum pump at a diverted flow rate; and a second gel supply line 430B that may be connected to the end portion of the first gel supply line 430A and is configured to flow a remainder of the supply flow at the terminal output flow rate into the dispensation tip of the gel dispensation apparatus, wherein the terminal output flow rate is the initial gel supply rate less the diverted flow rate. In one embodiment, the method may also include the steps of: providing a relative horizontal movement at a uniform speed along a lateral extension direction of the periphery of the interface between the end surface of FAU 300 and the surface of the PIC die 700.

Referring to all drawings and according to various embodiments of the present disclosure, an additional embodiment is drawn to a method of attaching fiber array unit (FAU) 300 to a photonic integrated circuit (PIC) die 700, the method may include the steps of: disposing an end surface of a fiber array unit (FAU) 300 on a surface of a photonic integrated circuit (PIC) die 700; providing a gel dispensation apparatus 400 including a first gel supply line 430A having a first flow control valve 420 and connected to a gel supply source 410, a vacuum line 440 having a second flow control valve 450, and a second gel supply line 430B that may be connected to a dispensation tip 461, wherein input orifices of the second gel supply line 430B and the vacuum line 440 may be connected to an output orifice of the first gel supply line 430A such that a terminal output flow rate of a portion of the gel that flows through the second gel supply line 430B is a difference between an initial gel supply rate of a flow of the gel through the first gel supply line 430A less a diverted flow rate of a fraction of the gel that flows through the vacuum line 440; and dispensing the gel around, and onto, a periphery of an interface between the end surface of FAU 300 and the surface of the PIC die 700 by inducing droplets of the gel to fall onto the periphery of the interface by gravity while generating optical images of the droplets around the dispensation tip 461 of the gel dispensation apparatus 400, and by adjusting the terminal output flow rate of the gel from the dispensation tip 461.

In an embodiment, adjusting of the terminal output flow rate of the gel may be performed by using a process controller including a processor and an image analysis program that analyzes the optical images; and the process controller controls at least one of the first flow control valve and the second flow control valve based on data extracted from analysis of the optical images. In one embodiment, the process controller determines whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets. In one embodiment, the method may further includes the steps of: positioning the dispensation tip 461 directly above a segment of the periphery of the interface between the FAU 300 and the PIC die 700 prior to inducing the droplets of the gel to fall onto the periphery of the interface; and providing a relative lateral movement between the dispensation tip 461 and the PIC die 700 along a horizontal extension direction of the segment of the periphery of the interface. In one embodiment, the method may further includes the steps of: holding an assembly of the FAU 300 and the PIC die 700 such that a Euclidean plane including the interface between the FAU 300 and the PIC die 700 is tilted relative to a direction of a local effective gravitational field during application of the droplets of the gel from the dispensation tip to the periphery of the interface.

Referring to all drawings and according to various embodiments of the present disclosure, an additional embodiment is drawn to a fiber-to-die attachment apparatus that includes: a fastening mechanism configured to dispose an end surface of a fiber array unit (FAU) 300 on a surface of a photonic integrated circuit (PIC) die 700; a gel dispensation apparatus 400 including a first gel supply line 430A having a first flow control valve 420 and connected to a gel supply source 410, a vacuum line 440 having a second flow control valve 450, and a second gel supply line 430B that is connected to a dispensation tip 461, wherein input orifices of the second gel supply line 430B and the vacuum line 440 may be connected to an output orifice of the first gel supply line 430A such that a terminal output flow rate of a portion of the gel that flows through the second gel supply line 430B may be a difference between an initial gel supply rate of a flow of the gel through the first gel supply line 430A less a diverted flow rate of a fraction of the gel that flows through the vacuum line 440; and an optical image generation system (500, 510) configured to generate optical images of droplets of the gel around the dispensation tip 461 during dispensation of the gel.

In an embodiment, the fiber-to-die attachment apparatus may also include a process controller 500 including a processor and an image analysis program that analyzes the optical images, and configured to control at least one of the first flow control valve 420 and the second flow control valve 450 based on data extracted from analysis of the optical images. In an embodiment, the process controller may be configured to determine whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets. In an embodiment, the fiber-to-die attachment apparatus may also include a positioning mechanism 960 that is configured to position the dispensation tip 461 directly above a segment of a periphery of an interface between the FAU 300 and the PIC die 700, and to provide a relative lateral movement between the dispensation tip 461 and an assembly 900 of the PIC die 700 and the FAU 300 along a horizontal extension direction of the segment of the periphery of the interface. In an embodiment, the fastening mechanism is configured to hold an assembly 900 of the FAU 300 and the PIC die 700 such that a Euclidean plane including an interface between the FAU 300 and the PIC die 700 may be tilted relative to a direction of a local effective gravitational field during application of droplets of the gel from the dispensation tip 461 to a segment of a periphery of the interface.

Referring to all drawings and according to various embodiments of the present disclosure, an additional embodiment is drawn to a fiber-to-die attachment apparatus that includes: a fastening mechanism configured to dispose an end surface of a fiber array unit (FAU) 300 on a surface of a photonic integrated circuit (PIC) die 700; a gel dispensation apparatus 400 configured to flow a stream of a gel at a terminal output flow rate out of a dispensation tip 461; a positioning mechanism 960 that may be configured to position the dispensation tip 461 directly above a segment of a periphery of an interface between the FAU 300 and the PIC die 700; an optical image generation system 500, 510 configured to generate optical images of droplets of the gel around the dispensation tip 461 during dispensation of the gel; and a process controller configured estimate a process parameter based on analysis of the optical images of the droplets and configured to increase or decrease the terminal output flow rate based on estimated values of the process parameter.

In an embodiment, the positioning mechanism is configured to provide a relative lateral movement between the dispensation tip 461 and the PIC die 700 along a horizontal extension direction of the segment of the periphery of the interface. In an embodiment, the positioning mechanism 960 is configured to hold the dispensation tip 461 with a vertical spacing between the dispensation tip 461 an the segment of the periphery of the interface between the FAU 300 and the PIC die 700, the vertical spacing greater than a maximum vertical dimension of a droplet of the gel that may be formed at the dispensation tip 461 before falling off. In an embodiment, the process controller is configured to determine a maximum vertical dimension of the droplets before fall-off by analyzing the optical images using a computer and an image analysis program; and the process controller is configured to increase or decrease the terminal output flow rate based on measured values of the maximum vertical dimension. In an embodiment, the process controller may be configured to determine a maximum lateral dimension of the droplets before the fall-off by analyzing the optical images using the computer and the image analysis program; and the process controller may be configured to increase or decrease the terminal output flow rate based on measured values of the maximum lateral dimension. In an embodiment, the process controller may be configured to measure a periodicity of fall-off times of the droplets by analyzing the optical images using a computer and an image analysis program; and the process controller may be configured to increase or decrease the terminal output flow rate based on measured values of the periodicity of the fall-off times. In an embodiment, the process controller may be configured to calculate an estimated data value for the terminal output flow rate by analyzing the optical images of the droplets; and the process controller may be configured to increase or decrease the terminal output flow rate through the dispensation tip 461 based on the estimated data value for the terminal output flow rate. In an embodiment, the process controller may be configured to calculate the estimated data value for the terminal output flow rate by: calculating maximum volumes for the droplets before fall-off by analyzing the optical images using a computer and an image analysis program; calculating time periods between success events of the fall-off of the droplets; and dividing a sum of the maximum volumes by the sum of the time periods. In an embodiment, the process controller may be configured to determine whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets; and the process controller may be configured to increase or decrease the terminal output flow rate in response to determining that the at least one measurement parameter is out of the respective specification range. In an embodiment, the gel dispensation apparatus may include: a first gel supply line 430A configured to provide a supply flow of a gel at an initial gel supply rate; a vacuum line 440 providing a controlled vacuum suction to an end portion of the first gel supply line 430A and diverting a fraction of the supply flow to a vacuum pump at a diverted flow rate; and a second gel supply line 430B that is connected to the end portion of the first gel supply line and is configured to flow a remainder of the supply flow at the terminal output flow rate toward the dispensation tip, wherein the terminal output flow rate is the initial gel supply rate less the diverted flow rate. In an embodiment, increasing the terminal output flow rate may be effected by increasing the initial gel supply rate of the gel; and decreasing the terminal output flow rate may be effected by decreasing the initial gel supply rate of the gel. In an embodiment, increasing the terminal output flow rate may be effected by decreasing the diverted flow rate of the gel; and decreasing the terminal output flow rate may be effected by increasing the diverted flow rate of the gel.

Referring collectively to FIGS. 2A, 2B, 4A, 4B, 5A, 5B, 6A, 6B, 8A, 8B, 9A, and 9B, various features of the present disclosure may be present during operation of the fiber-to-die attachment apparatus of the present disclosure. For example, the dispensation tip 461 may be positioned directly above, and is aligned along a vertical direction to, a segment of the interface while dispensing the gel. The vertical direction may be defined by a direction of a local effective gravitational field. The gel may be dispensed in discrete droplets 470 that fall downward along the direction of the local effective gravitational field.

Optical images of droplets 470 of the gel around the dispensation tip 461 of the gel dispensation apparatus 400 may be generated, and may be subsequently used to determine various parameters. For example, a maximum vertical dimension of the droplets 470 before fall-off may be determined by analyzing the optical images using a computer and an image analysis program, and the terminal output flow rate may be adjusted based on measured values of the maximum vertical dimension.

In one embodiment, a maximum lateral dimension of the droplets 470 before the fall-off may be determined by analyzing the optical images using the computer and the image analysis program, and the terminal output flow rate may be adjusted based on measured values of the maximum lateral dimension.

In one embodiment, optical images of droplets 470 of the gel around the dispensation tip 461 of the gel dispensation apparatus 400 may be generated, and a periodicity of fall-off times of the droplets 470 may be determined by analyzing the optical images using a computer and an image analysis program, and the terminal output flow rate may be adjusted based on measured values of the periodicity of the fall-off times.

In one embodiment, optical images of droplets 470 of the gel around the dispensation tip 461 of the gel dispensation apparatus 400 may be generated, and an estimated data value for the terminal output flow rate may be calculated by analyzing the optical images of the droplets 470, and the terminal output flow rate through the dispensation tip 461 may be increased or decreased based on the estimated data value for the terminal output flow rate. In one embodiment, the estimated data value for the terminal output flow rate may be calculated by: (1) calculating maximum volumes for the droplets 470 before fall-off by analyzing the optical images using a computer and an image analysis program; (2) calculating time periods between success events of the fall-off of the droplets 470; and (3) dividing a sum of the maximum volumes by the sum of the time periods.

In one embodiment, optical images of droplets 470 of the gel around the dispensation tip 461 of the gel dispensation apparatus 400 may be generated, and a processor and an image analysis program that analyzes the optical images may be used to determine whether at least one measurement parameter is within a respective specification range. The at least one measurement parameter may be selected from an estimated data value for the terminal output flow rate, a maximum vertical dimension for the droplets 470, a maximum lateral dimension for the droplets 470, and a time period between success fall-offs of the droplets 470. The terminal output flow rate may be increased or decreased if the at least one measurement parameter is out of the respective specification range.

In one embodiment, increasing the terminal output flow rate may be effected by increasing the initial gel supply rate of the gel, and/or decreasing the terminal output flow rate may be effected by decreasing the initial gel supply rate of the gel. Alternatively or additionally, increasing the terminal output flow rate may be effected by decreasing the diverted flow rate of the gel, and/or decreasing the terminal output flow rate may be effected by increasing the diverted flow rate of the gel.

In one embodiment, an assembly of the PIC die 700 and the FAU 300 may be tilted such that a Euclidean plane containing the interface between the end surface of FAU 300 and the surface of the PIC die 700 is tilted relative to a direction of a local effective gravitational field by a non-zero tilt angle.

In one embodiment, the gel dispensation apparatus 400 may comprise: a first gel supply line 430A configured to receive an influx of the gel from a gel supply source 410 and to provide a supply flow of the gel at an initial gel supply rate; a vacuum line 440 providing a controlled vacuum suction to an end portion of the first gel supply line 430A and diverting a fraction of the supply flow to a vacuum pump at a diverted flow rate; and a second gel supply line 430B that is connected to the end portion of the first gel supply line 430A and is configured to flow a remainder of the supply flow at the terminal output flow rate into the dispensation tip 461 of the gel dispensation apparatus 400, wherein the terminal output flow rate is the initial gel supply rate less the diverted flow rate.

In one embodiment, adjusting of the terminal output flow rate of the gel may be performed using a process controller 500 including a processor and an image analysis program that analyzes the optical images, and the process controller controls at least one of the first flow control valve 420 and the second flow control valve 450 based on data extracted from analysis of the optical images.

In one embodiment, a relative horizontal movement may be provided at a uniform speed along a lateral extension direction of the periphery of the interface between the end surface of FAU 300 and the surface of the PIC die 700 so that the gel is applied to the periphery of the interface between the FAU 300 and the PIC die 700 at a uniform rate.

The various embodiments of the present disclosure may be used to apply a gel for affixing an FAU 300 to a PIC die 700 in discrete droplets 470 at a uniform and well-controlled rate while providing a relative lateral (horizontal) movement between the dispensation tip 461 and the assembly of the FAU 300 and the PIC die 700 as temporarily affixed to each other by a fastening mechanism 900. The various embodiments of the present disclosure may be used to enhance process uniformity and the throughput of the process that attaches an FAU 300 to a PIC die 700.

The foregoing outlines features of several embodiments so that those skilled in the art may better understand the aspects of the present disclosure. Each embodiment described using the term "comprises" also inherently discloses additional embodiments in which the term "comprises" is replaced with "consists essentially of" or with the term "consists of," unless expressly disclosed otherwise herein. Whenever two or more elements are listed as alternatives in a same paragraph of in different paragraphs, a Markush group including a listing of the two or more elements is also impliedly disclosed. Whenever the auxiliary verb "may" is used in this disclosure to describe formation of an element or performance of a processing step, an embodiment in which such an element or such a processing step is not performed is also expressly contemplated, provided that the resulting apparatus or device may provide an equivalent result. As such, the auxiliary verb "may" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of attaching a fiber array unit (FAU) to a photonic integrated circuit (PIC) die, the method comprising:

disposing an end surface of the FAU on a surface of the PIC die that contains, or is proximal to, end surfaces of waveguides with the PIC die;

providing a gel dispensation apparatus including a first gel supply line configured to provide a supply flow of a gel at an initial gel supply rate, a vacuum line providing a controlled vacuum suction to an end portion of the first gel supply line and diverting a fraction of the supply flow to a vacuum pump at a diverted flow rate, and a second gel supply line that is connected to the end portion of the first gel supply line and is configured to flow a remainder of the supply flow at a terminal output flow rate toward a dispensation tip of the gel dispensation apparatus, wherein the terminal output flow rate is the initial gel supply rate less the diverted flow rate;

dispensing the gel around, and onto, a periphery of an interface between the end surface of FAU and the surface of the PIC die; and curing a dispensed portion of the gel around the periphery of the interface, whereby the FAU is attached to the PIC die.

2. The method of claim 1, wherein:

the dispensation tip is positioned directly above, and is aligned along a vertical direction to, a segment of the interface while dispensing the gel;

the vertical direction is defined by a direction of a local effective gravitational field; and the gel is dispensed in discrete droplets that fall downward along the direction of the local effective gravitational field.

3. The method of claim 2, further comprising:

generating optical images of droplets of the gel around the dispensation tip of the gel dispensation apparatus;

determining a maximum vertical dimension of the droplets before fall-off by analyzing the optical images of droplets of the gel using a computer and an image analysis program; and adjusting the terminal output flow rate based on measured values of the maximum vertical dimension.

4. The method of claim 3, further comprising:

determining a maximum lateral dimension of the droplets before the fall-off by analyzing the optical images using the computer and the image analysis program; and adjusting the terminal output flow rate based on measured values of the maximum lateral dimension.

5. The method of claim 2, further comprising:

generating optical images of droplets of the gel around the dispensation tip of the gel dispensation apparatus;

determining a periodicity of fall-off times of the droplets by analyzing the optical images using a computer and an image analysis program; and adjusting the terminal output flow rate based on measured values of the periodicity of the fall-off times.

6. The method of claim 2, further comprising:

generating optical images of droplets of the gel around the dispensation tip of the gel dispensation apparatus;

calculating an estimated data value for the terminal output flow rate by analyzing the optical images of the droplets; and increasing or decreasing the terminal output flow rate through the dispensation tip based on the estimated data value for the terminal output flow rate.

7. The method of claim 6, wherein the estimated data value for the terminal output flow rate is calculated by:

calculating maximum volumes for the droplets before fall-off by analyzing the optical images using a computer and an image analysis program;

calculating time periods between success events of the fall-off of the droplets; and dividing a sum of the maximum volumes by the sum of the time periods.

8. The method of claim 2, further comprising:

generating optical images of droplets of the gel around the dispensation tip of the gel dispensation apparatus;

determining, using a processor and an image analysis program that analyzes the optical images, whether at least one measurement parameter is within a respective specification range, the at least one measurement parameter being selected from an estimated data value for the terminal output flow rate, a maximum vertical dimension for the droplets, a maximum lateral dimension for the droplets, and a time period between success fall-offs of the droplets; and increasing or decreasing the terminal output flow rate in response to determining that the at least one measurement parameter is out of the respective specification range.

9. The method of claim 8, wherein:

increasing the terminal output flow rate is effected by increasing the initial gel supply rate of the gel; and decreasing the terminal output flow rate is effected by decreasing the initial gel supply rate of the gel.

10. The method of claim 8, wherein:

increasing the terminal output flow rate is effected by decreasing the diverted flow rate of the gel; and decreasing the terminal output flow rate is effected by increasing the diverted flow rate of the gel.

11. A method of attaching a fiber array unit (FAU) to a photonic integrated circuit (PIC) die, the method comprising:

disposing an end surface of the FAU on a surface of the PIC die that contains, or is proximal to, end surfaces of waveguides within the PIC die;

providing a gel dispensation apparatus including:

a first gel supply line configured to provide a supply flow of a gel at an initial gel supply rate, a vacuum line providing controlled vacuum suction to an end portion of the first gel supply line and diverting a fraction of the supply flow to a vacuum pump at a diverted flow rate, and a second gel supply line connected to the end portion of the first gel supply line and configured to flow a remainder of the supply flow at a terminal output flow rate toward a dispensation tip, wherein the terminal output flow rate is the initial gel supply rate less the diverted flow rate;

dispensing the gel in discrete droplets from the dispensation tip onto a periphery of an interface between the FAU and the PIC die; and curing a dispensed portion of the gel to attach the FAU to the PIC die.

12. The method of claim 11, further comprising:

generating real-time optical images of the droplets at the dispensation tip using an optical camera;

analyzing the optical images to estimate the terminal output flow rate by dividing a sum of maximum droplet volumes by a sum of time periods between successive droplet fall-offs; and adjusting at least one of the initial gel supply rate and the diverted flow rate if the estimated terminal output flow rate deviates from a target range.

13. The method of claim 11, further comprising tilting an assembly of the PIC die and the FAU such that a plane containing the interface is at a non-zero angle relative to a local gravitational field during gel dispensation.

14. The method of claim 11, further comprising:

positioning the dispensation tip directly above a segment of the periphery of the interface; and providing a relative horizontal movement between the dispensation tip and the assembly along a lateral extension direction of the segment at a constant speed.

15. The method of claim 14, wherein the constant speed is selected such that the gel is applied at a uniform volumetric rate per unit length along the periphery.

* * * * *